United States Patent
Uchino et al.

(10) Patent No.: US 11,991,564 B2
(45) Date of Patent: May 21, 2024

(54) PRIORITIZING COMMUNICATIONS FOR MULTIPLE RADIO ACCESS TECHNOLOGIES

(71) Applicant: QUALCOMM Incorporated, San Diego, CA (US)

(72) Inventors: Toru Uchino, Zushi (JP); Kazuki Takeda, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 203 days.

(21) Appl. No.: 17/454,785

(22) Filed: Nov. 12, 2021

(65) Prior Publication Data

US 2023/0156529 A1    May 18, 2023

(51) Int. Cl.
*H04W 36/00*    (2009.01)
*H04W 28/02*    (2009.01)
*H04W 36/30*    (2009.01)

(52) U.S. Cl.
CPC ... *H04W 36/0022* (2013.01); *H04W 28/0263* (2013.01); *H04W 36/0027* (2013.01); *H04W 36/30* (2013.01)

(58) Field of Classification Search
CPC ......... H04W 36/0022; H04W 36/0027; H04W 36/30; H04W 28/02; H04W 28/0252; H04W 28/0263; H04W 72/569; H04W 76/14; H04W 4/40; H04W 4/46
See application file for complete search history.

(56) References Cited

U.S. PATENT DOCUMENTS 11,057,811 B2 *   7/2021  Lu .................. H04W 40/22
2016/0295624 A1  10/2016  Novlan et al.
2019/0313469 A1  10/2019  Karampatsis et al.
2020/0195414 A1*  6/2020  Nguyen ............. H04L 5/1469
2021/0345360 A1* 11/2021  Yeo .................. H04W 72/20
2021/0368575 A1* 11/2021  Gao .................. H04W 76/16
2021/0385685 A1* 12/2021  Khoryaev ........ H04W 28/0273
2021/0410162 A1* 12/2021  Kang ................ H04W 72/23
2022/0095368 A1*  3/2022  Yu ................... H04W 72/0446
2022/0386230 A1* 12/2022  Matolia ............. H04W 48/18

FOREIGN PATENT DOCUMENTS

WO    WO-2017189035 A1    11/2017
WO    WO-2020096433 A1     5/2020

OTHER PUBLICATIONS

International Search Report and Written Opinion—PCT/US2022/075775—ISA/EPO—dated Nov. 24, 2022.

* cited by examiner

*Primary Examiner* — Robert C Scheibel
(74) *Attorney, Agent, or Firm* — Harrity & Harrity, LLP

(57) ABSTRACT

Various aspects of the present disclosure generally relate to wireless communication. In some aspects, a user equipment (UE) may determine that transmission of one or more first messages, to a wireless device and via a first radio access technology (RAT), does not meet a transmission quality threshold associated with the one or more first messages, wherein the one or more first messages are time domain multiplexed with one or more second messages that are to be transmitted to the wireless device via a second RAT. The UE may adjust a prioritization of the one or more first messages or the one or more second messages to prioritize the transmission of the one or more first messages over the one or more second messages. Numerous other aspects are described.

30 Claims, 13 Drawing Sheets

PRIORITIZING COMMUNICATIONS FOR MULTIPLE RADIO ACCESS TECHNOLOGIES

FIELD OF THE DISCLOSURE

Aspects of the present disclosure generally relate to wireless communication and to techniques and apparatuses for prioritizing communications for multiple radio access technologies.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a mobile station. The method may include determining, by the mobile station, that transmission of one or more first messages, to a wireless device and via a first radio access technology (RAT), does not meet a transmission quality threshold associated with the one or more first messages, where the one or more first messages are time domain multiplexed with one or more second messages that are to be transmitted to the wireless device via a second RAT. The method may include adjusting, by the mobile station, a prioritization of the one or more first messages or the one or more second messages to prioritize the transmission of the one or more first messages over the one or more second messages.

Some aspects described herein relate to a method of wireless communication performed by a mobile station. The method may include determining, by the mobile station, that transmission of one or more first messages, to a wireless device and via a first RAT, does not meet a transmission quality threshold, where the one or more first messages are time domain multiplexed with one or more second messages that are to be transmitted to the wireless device via a second RAT. The method may include transmitting, by the mobile station and to the wireless device and via the second RAT, the one or more first messages.

Some aspects described herein relate to a method of wireless communication performed by a wireless device. The method may include receiving, by the wireless device and from a mobile station, data indicating that one or more first messages are to be transmitted via a first RAT with an adjusted prioritization, where the one or more first messages are time domain multiplexed with one or more second messages that are to be transmitted to the wireless device via a second RAT. The method may include adjusting, by the wireless device and based at least in part on receiving the data, one or more reception opportunities associated with at least one of the one or more first messages or the one or more second messages to prioritize reception of the one or more first messages over the one or more second messages.

Some aspects described herein relate to a mobile station for wireless communication. The mobile station may include a memory and one or more processors coupled to the memory. The one or more processors may be configured to determine that transmission of one or more first messages, to a wireless device and via a first RAT, does not meet a transmission quality threshold associated with the one or more first messages. The one or more processors may be configured to adjust a prioritization of the one or more first messages or the one or more second messages to prioritize the transmission of the one or more first messages over the one or more second messages.

Some aspects described herein relate to a mobile station for wireless communication. The mobile station may include a memory and one or more processors coupled to the memory. The one or more processors may be configured to determine that transmission of one or more first messages, to a wireless device and via a first RAT, does not meet a transmission quality threshold. The one or more processors may be configured to transmit, to the wireless device and via the second RAT, the one or more first messages.

Some aspects described herein relate to a wireless device for wireless communication. The wireless device may include a memory and one or more processors coupled to the memory. The one or more processors may be configured to receive, from a mobile station, data indicating that one or more first messages are to be transmitted via a first RAT with an adjusted prioritization. The one or more processors may be configured to adjust, based at least in part on receiving the data, one or more reception opportunities associated with at least one of the one or more first messages or the one or more second messages to prioritize reception of the one or more first messages over the one or more second messages.

Some aspects described herein relate to a non-transitory computer-readable medium that stores a set of instructions for wireless communication by a mobile station. The set of instructions, when executed by one or more processors of the mobile station, may cause the mobile station to determine that transmission of one or more first messages, to a wireless device and via a first RAT, does not meet a transmission quality threshold associated with the one or more first messages. The set of instructions, when executed by one or more processors of the mobile station, may cause the mobile station to adjust a prioritization of the one or more first messages or the one or more second messages to prioritize the transmission of the one or more first messages over the one or more second messages.

Some aspects described herein relate to a non-transitory computer-readable medium that stores a set of instructions for wireless communication by a mobile station. The set of instructions, when executed by one or more processors of the mobile station, may cause the mobile station to determine that transmission of one or more first messages, to a wireless device and via a first RAT, does not meet a transmission quality threshold. The set of instructions, when executed by one or more processors of the mobile station, may cause the mobile station to transmit, to the wireless device and via the second RAT, the one or more first messages.

Some aspects described herein relate to a non-transitory computer-readable medium that stores a set of instructions for wireless communication by a wireless device. The set of instructions, when executed by one or more processors of the wireless device, may cause the wireless device to receive, from a mobile station, data indicating that one or more first messages are to be transmitted via a first RAT with an adjusted prioritization. The set of instructions, when executed by one or more processors of the wireless device, may cause the wireless device to adjust, based at least in part on receiving the data, one or more reception opportunities associated with at least one of the one or more first messages or the one or more second messages to prioritize reception of the one or more first messages over the one or more second messages.

Some aspects described herein relate to an apparatus for wireless communication. The apparatus may include means for determining that transmission of one or more first messages, to a wireless device and via a first RAT, does not meet a transmission quality threshold associated with the one or more first messages, where the one or more first messages are time domain multiplexed with one or more second messages that are to be transmitted to the wireless device via a second RAT. The apparatus may include means for adjusting a prioritization of the one or more first messages or the one or more second messages to prioritize the transmission of the one or more first messages over the one or more second messages.

Some aspects described herein relate to an apparatus for wireless communication. The apparatus may include means for determining that transmission of one or more first messages, to a wireless device and via a first RAT, does not meet a transmission quality threshold, where the one or more first messages are time domain multiplexed with one or more second messages that are to be transmitted to the wireless device via a second RAT. The apparatus may include means for transmitting, to the wireless device and via the second RAT, the one or more first messages.

Some aspects described herein relate to an apparatus for wireless communication. The apparatus may include means for receiving, from a mobile station, data indicating that one or more first messages are to be transmitted via a first RAT with an adjusted prioritization, where the one or more first messages are time domain multiplexed with one or more second messages that are to be transmitted to the wireless device via a second RAT. The apparatus may include means for adjusting, based at least in part on receiving the data, one or more reception opportunities associated with at least one of the one or more first messages or the one or more second messages to prioritize reception of the one or more first messages over the one or more second messages.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) RAT, aspects of the present disclosure can be applied to other RATs, such as a 3G RAT, a 4G RAT, and/or a RAT subsequent to 5G (e.g., 6G).

Figure 1:
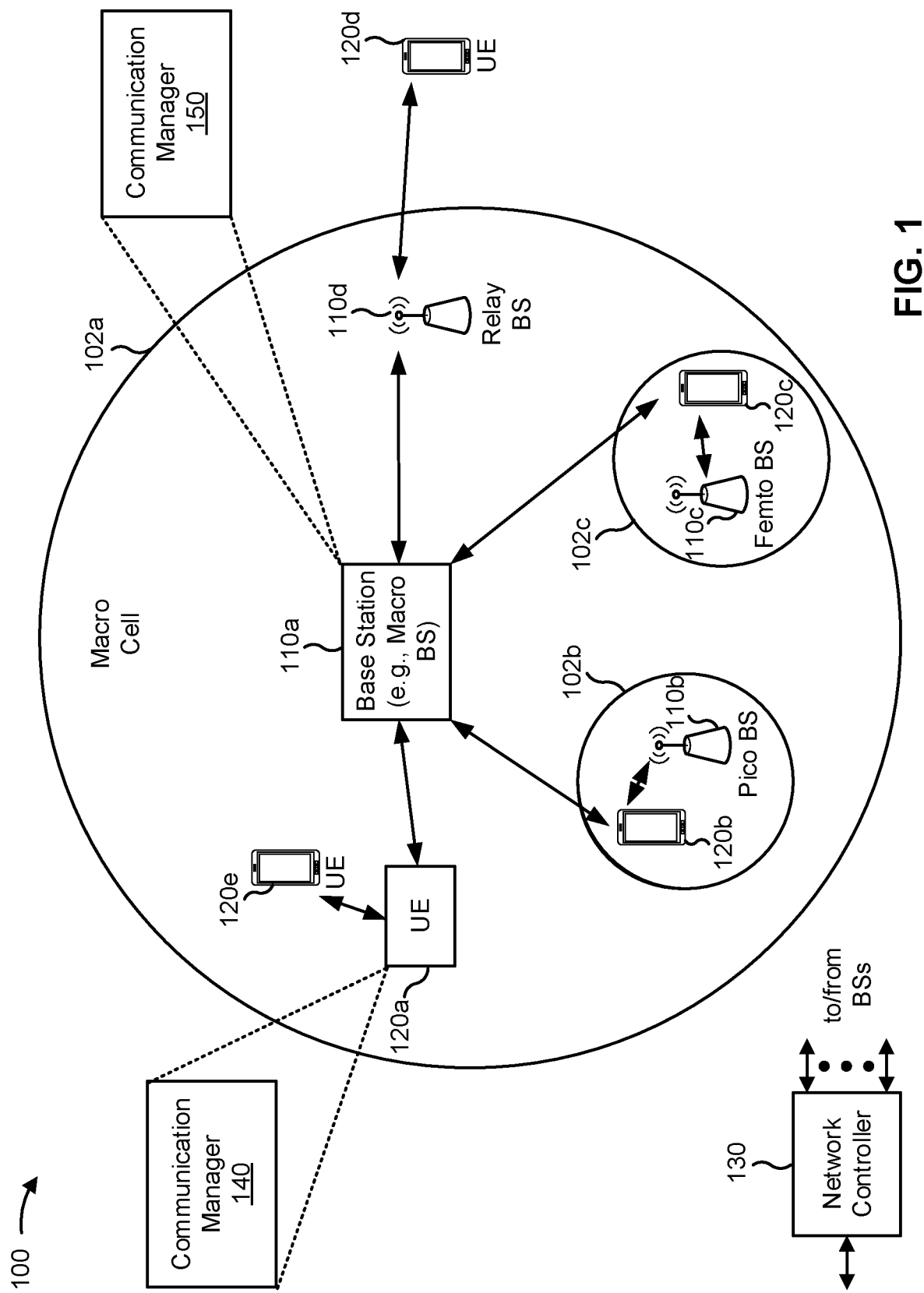
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the mobile station (e.g., UE 120) may include a communication manager 140. As described in more detail elsewhere herein, the communication manager 140 may determine that transmission of one or more first messages, to a wireless device and via a first RAT, does not meet a transmission quality threshold associated with the one or more first messages, wherein the one or more first messages are time domain multiplexed with one or more second messages that are to be transmitted to the wireless device via a second RAT; and adjust a prioritization of the one or more first messages or the one or more second messages to prioritize the transmission of the one or more first messages over the one or more second messages. Additionally, or alternatively, the communication manager 140 may perform one or more other operations described herein.

In some aspects, the mobile station (e.g., UE 120) may include a communication manager 140. As described in more detail elsewhere herein, the communication manager 140 may determine that transmission of one or more first messages, to a wireless device and via a first RAT, does not meet a transmission quality threshold, wherein the one or more first messages are time domain multiplexed with one or more second messages that are to be transmitted to the wireless device via a second RAT; and transmit, to the wireless device and via the second RAT, the one or more first messages. Additionally, or alternatively, the communication manager 140 may perform one or more other operations described herein.

In some aspects, the wireless device (e.g., base station 110 or UE 120) may include a communication manager 140 or 150. As described in more detail elsewhere herein, the communication manager 140 or 150 may receive, from a mobile station, data indicating that one or more first messages are to be transmitted via a first RAT with an adjusted prioritization, wherein the one or more first messages are time domain multiplexed with one or more second messages that are to be transmitted to the wireless device via a second RAT; and adjust, based at least in part on receiving the data, one or more reception opportunities associated with at least one of the one or more first messages or the one or more second messages to prioritize reception of the one or more first messages over the one or more second messages. Additionally, or alternatively, the communication manager 140 or 150 may perform one or more other operations described herein.

As indicated above, FIG. 1 is provided as an example. Other examples may differ from what is described with regard to FIG. 1.

Figure 2:
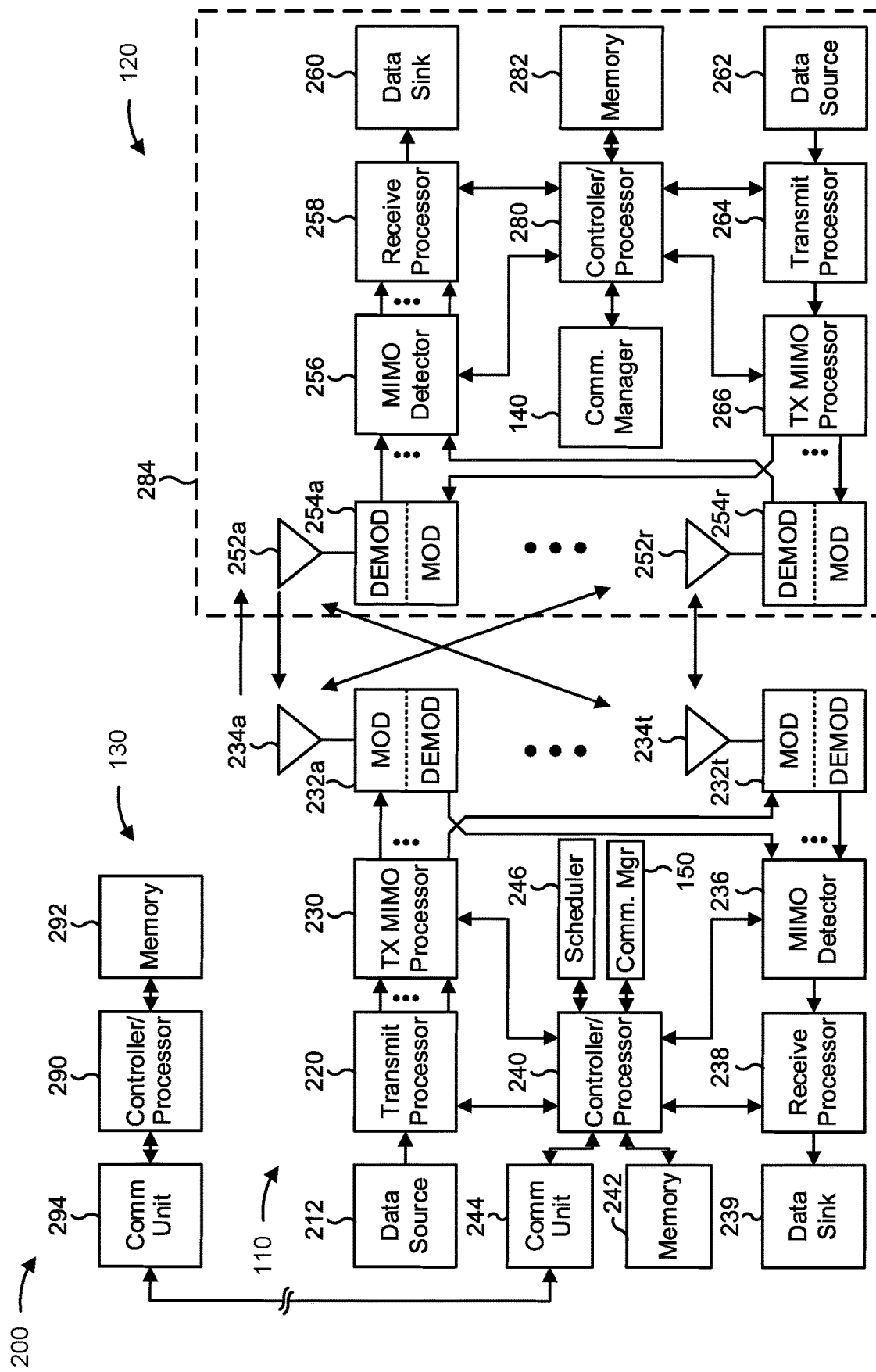
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-13).

The controller/processor 240 of the base station 110, the controller/processor 280 of the UE 120, and/or any other component(s) of FIG. 2 may perform one or more techniques associated with prioritizing communications for multiple radio access technologies, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the mobile station includes means for determining, by the mobile station, that transmission of one or more first messages, to a wireless device and via a first RAT, does not meet a transmission quality threshold associated with the one or more first messages, wherein the one or more first messages are time domain multiplexed with one or more second messages that are to be transmitted to the wireless device via a second RAT; and/or means for adjusting, by the mobile station, a prioritization of the one or more first messages or the one or more second messages to prioritize the transmission of the one or more first messages over the one or more second messages. In some aspects, the means for the mobile station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the mobile station to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the mobile station includes means for determining, by the mobile station, that transmission of one or more first messages, to a wireless device and via a first RAT, does not meet a transmission quality threshold, wherein the one or more first messages are time domain multiplexed with one or more second messages that are to be transmitted to the wireless device via a second RAT; and/or means for transmitting, by the mobile station and to the wireless device and via the second RAT, the one or more first messages. In some aspects, the means for the mobile station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the mobile station to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the wireless device includes means for receiving, by the wireless device and from a mobile station, data indicating that one or more first messages are to be transmitted via a first RAT with an adjusted prioritization, wherein the one or more first messages are time domain multiplexed with one or more second messages that are to be transmitted to the wireless device via a second RAT; and/or means for adjusting, by the wireless device and based at least in part on receiving the data, one or more reception opportunities associated with at least one of the one or more first messages or the one or more second messages to prioritize reception of the one or more first messages over the one or more second messages. In some aspects, the means for the wireless device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the wireless device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
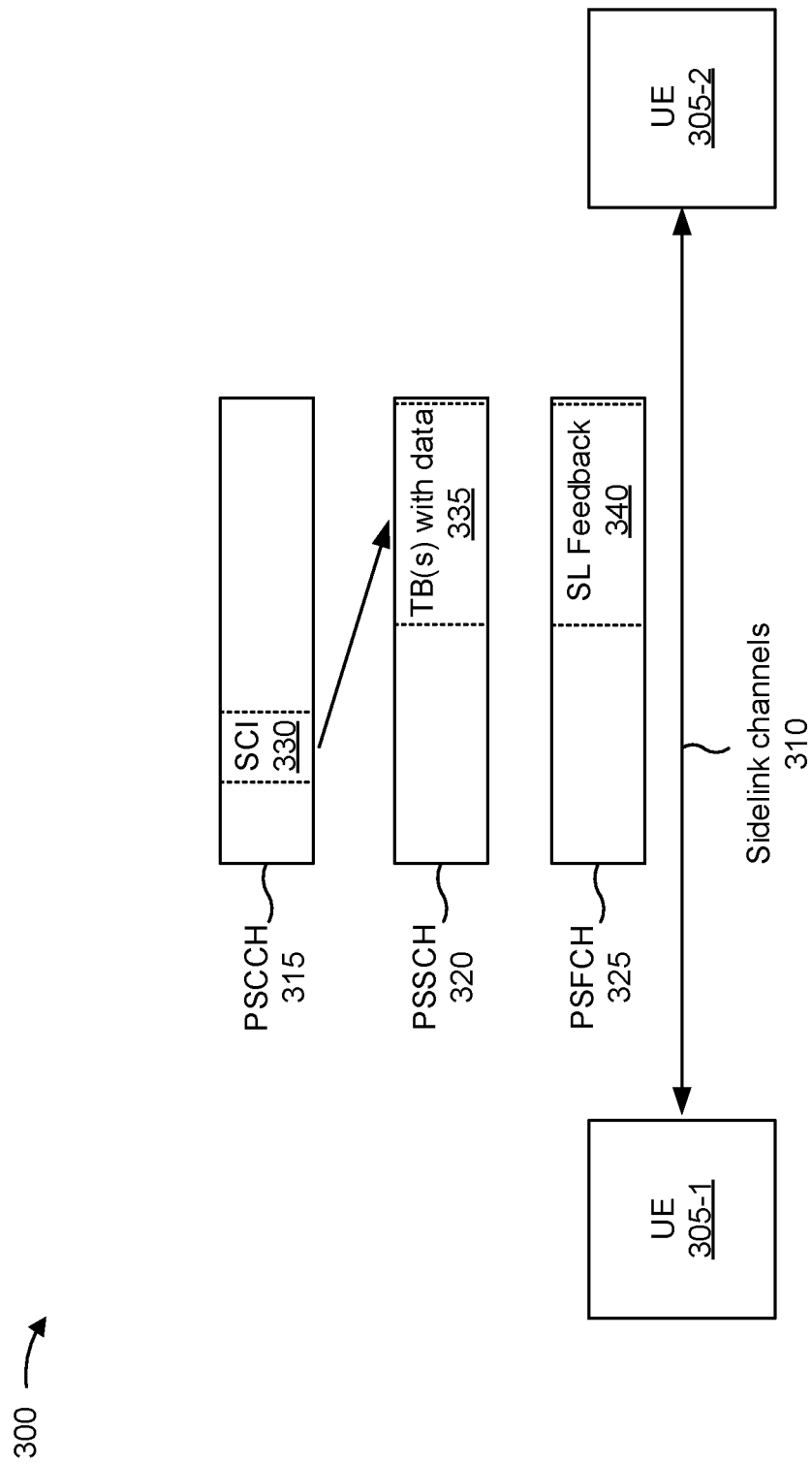
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some aspects, a UE 305 may operate using a transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection RSRP and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
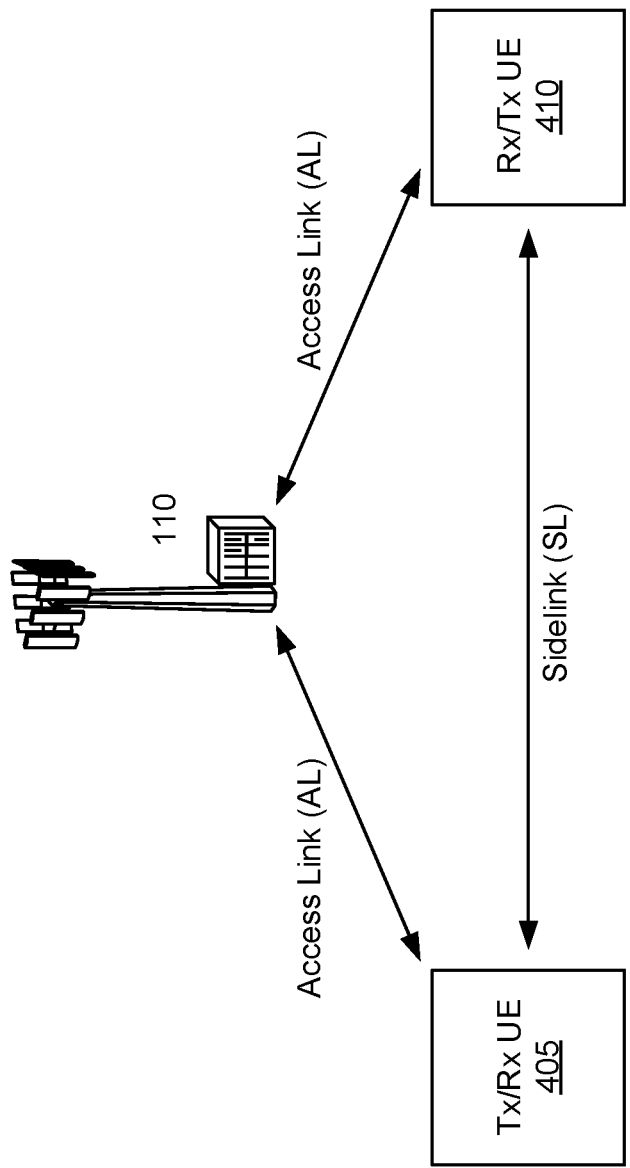
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
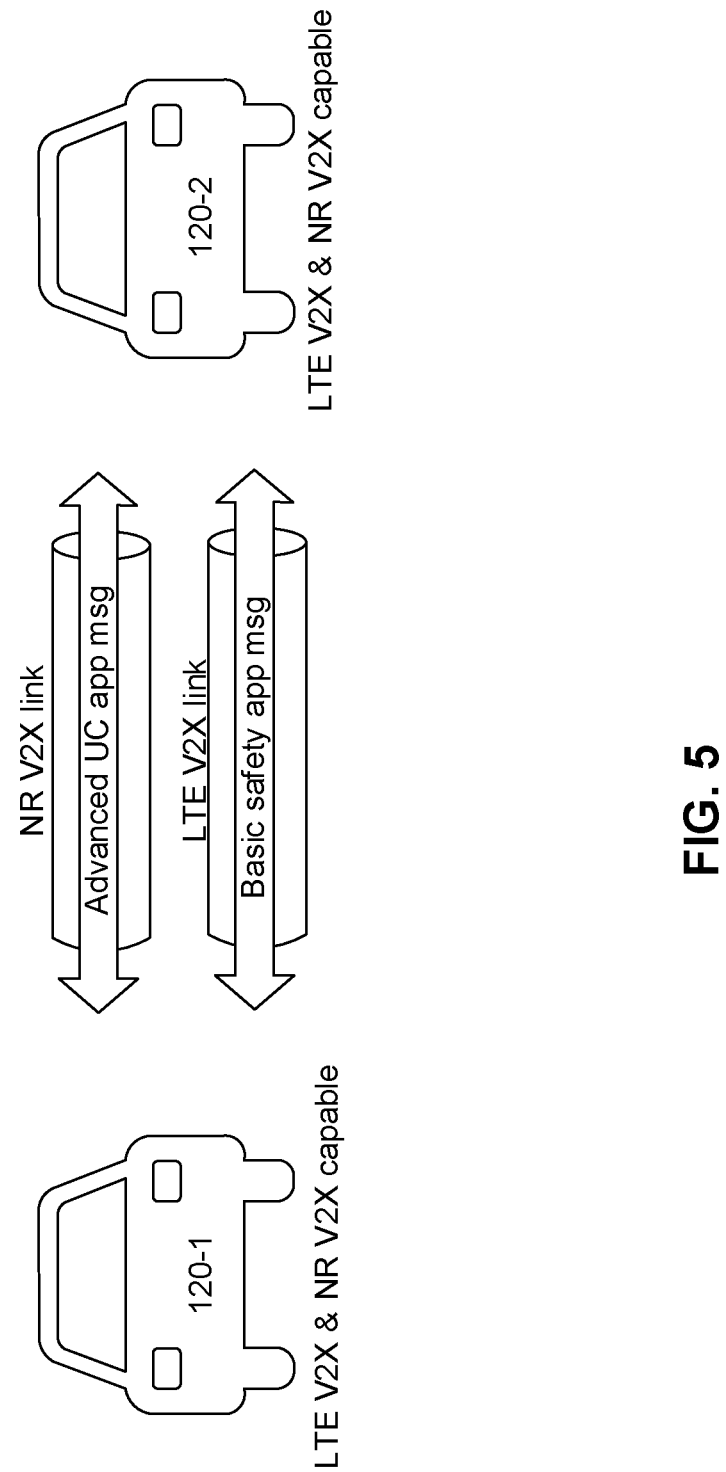
FIG. 5 is a diagram illustrating an example of vehicle-to-everything (V2X) communications using multiple radio access technologies (RATs), in accordance with the present disclosure.

FIG. 5 is a diagram illustrating an example 500 of V2X communications using multiple RATs, in accordance with the present disclosure. As shown in FIG. 5, two UEs (e.g., UEs 120-1 and 120-2, each associated with a vehicle) may communicate with one another using multiple links associated with different RATs (e.g., an NR link and an LTE link).

In some aspects, different V2X links may be used to transmit different types of messages, with different priorities (e.g., different QoS), and/or for different channels. For example, the UEs may use an LTE link to communicate messages associated with a basic safety application (e.g., enabling the sharing of vehicle status information, such as vehicle position, velocity, heading, acceleration, and/or the like). The basic safety application messages may be generated and transmitted periodically (e.g., 100 ms of periodicity). As another example, the UEs may use an NR link to transmit advanced use case (UC) application messages (e.g., enabling negotiated messages between vehicles and infrastructure for lane merging, among other examples). Depending on the conditions associated with the links, in some aspects, the NR link may often be associated with a higher reliability and a lower latency.

When transmitting communications to one another via LTE and NR links, an application layer associated with a UE may provide lower layers with a priority associated with the communications, such as a QoS value, using a model that corresponds to the type of link. Based at least in part on the priority, and configuration of the UE, the UE may attempt transmission of the communication. For example, in an LTE link, ProSe Per-Packet Priority (PPPP) and ProSe Per-Packet Reliability (PPPR) may be provided by the application layer, and the UE may map the communication to a corresponding bearer. As another example, in an NR link, priority information (e.g., QoS information) may be provided by the application layer and mapped on a QoS identifier (5QI) based at least in part on the priority information and UE configuration. The communication may then be mapped to a corresponding radio bearer by the service data adaptation protocol (SDAP) layer.

When scheduling a V2X communication, a UE may transmit sidelink control information (SCI) that indicates a time domain resource assignment (TDRA) for the communication. For example, the SCI may include a TDRA field that includes a TDRA index value. The TDRA index value may indicate a row index of a corresponding TDRA table, and the row index may correspond to a set of TDRA parameters (sometimes referred to as scheduling parameters or scheduling information). The Tx UE and Rx UE may use the TDRA parameters for the scheduled communications. In some aspects, the TDRA parameters may indicate a scheduling offset (e.g., in number of slots) between a slot containing the scheduling SCI (that schedules a V2X communication) and the slot containing the scheduled V2X communication (scheduled by the scheduling SCI). Other TDRA parameters may include a parameter indicating a starting symbol for the V2X communication, a parameter indicating a length (e.g., a number of consecutive symbols) of the V2X communication (e.g., in the indicated slot), and/or the like.

In some aspects, UEs may communicate with one another using multiple RATs using time-division multiplexing. For example, each UE may be aware of (e.g., based at least in part on SCI and/or TDRA) the frame indices of communications (e.g., communications channels, signals, and/or the like) scheduled for transmission to/from the UE. The UE may transmit, or receive, communications such that a subframe boundary of one communication is aligned with the subframe boundary of another communication.

While the example 500 depicts V2X communications between UEs using multiple RATs, other examples may include other time-division multiplexed sidelink communications between UEs using multiple RATs and/or time-division multiplexed downlink/uplink communications between a UE and a base station using multiple RATs. As indicated above, FIG. 5 is provided as an example. Other examples may differ from what is described with respect to FIG. 5.

In situations where a UE is communicating with another wireless device (e.g., another UE or a base station) using multiple RATs, the UE may occasionally be unable to guarantee sufficient transmission or reception opportunities for one or more of the multiple RATs (e.g., resource starvation). This may lead to messages being dropped, and in some cases, continuous dropping of messages that are of lower priority. For example, the UE may continuously drop basic safety application messages that are associated with an LTE link due to transmission and/or reception of advanced UC messages and/or other messages that might collide with (e.g., interfere with) transmission and/or reception of the basic safety application messages (e.g., due to the advance UC messages and/or other messages having a priority, or QoS, higher than the basic safety application messages). The message handling priority across multiple RATs may lead to dropped transmissions and/or reception opportunities that fall below a target transmission and/or reception quality threshold. Dropped transmissions and/or reception opportunities may lead to wireless devices wasting resources, including wasting network resources, processing resources, power resources, and/or the like (e.g., due to re-transmission attempts and wasted reception opportunities).

Some techniques and apparatuses described herein enable a UE to communicate with another wireless device via multiple RATs simultaneously (e.g., using a time-division multiplexing), while addressing dropped transmission and reception opportunities by switching message priorities and/or switching RATs used to transmit particular messages. For example, a UE may adjust prioritization (e.g., QoS) associated with one or more messages, to be communicated via a first RAT, that are not going to meet a transmission quality threshold (e.g., a transmission periodicity threshold) to cause the message(s) to be transmitted with a higher priority than other messages. As another example, the UE may switch the RAT used for transmission of the message(s) to enable a different RAT (e.g., one associated with higher priority transmissions) to transmit the message(s). As a result, the UE may change the priority and/or RAT used to transmit and/or receive messages, which may provide improved transmission and/or reception periodicity for messages transmitted via different RATs. This may lead to wireless devices having fewer dropped transmissions and/or reception opportunities and may lead to improved wireless device resource usage, including improved usage and/or efficiency of network resources, processing resource, power resources, and/or the like (e.g., due to a reduction in re-transmission attempts and wasted reception opportunities).

Figure 6:
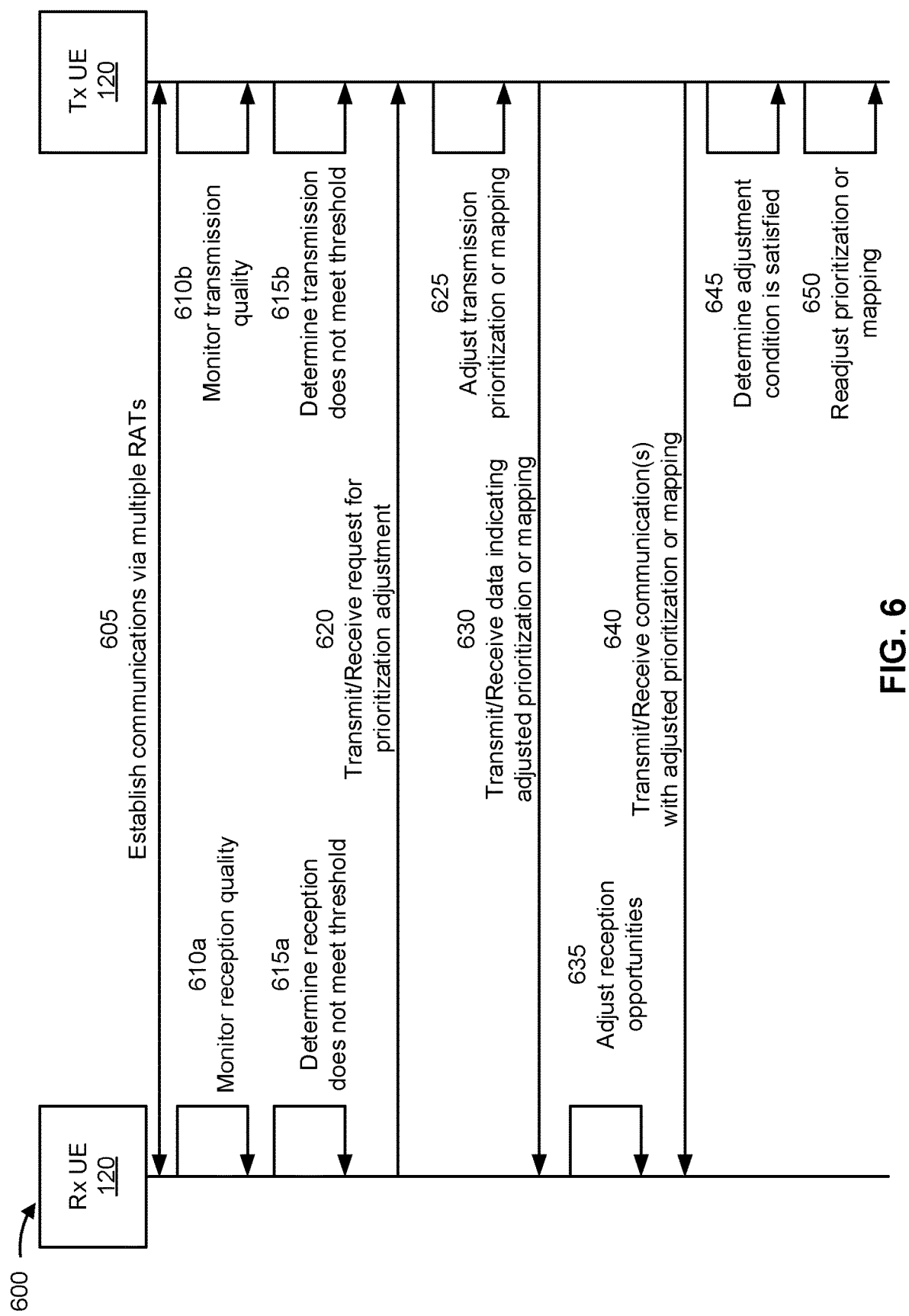
FIG. 6 is a diagram illustrating an example associated with prioritizing communications for multiple RATs, in accordance with the present disclosure.

FIG. 6 is a diagram illustrating an example 600 associated with prioritizing communications for multiple RATs, in accordance with the present disclosure. As shown in FIG. 6, an Rx UE (e.g., UE 120) may communicate with a Tx UE via one or more sidelink communications. In some aspects, the Tx UE and/or Rx UE may communicate with another wireless device, such as a base station (e.g., base station 110) via one or more uplink and/or downlink communications (e.g., in addition to, or in place of, communicating with another UE). The UEs and the base station may be part of a wireless network (e.g., wireless network 100).

As shown by reference number 605, the Rx UE and Tx UE may establish communications with one another via multiple RATs. For example, as described herein, the Rx/Tx UEs may establish sidelink communications via 3G RAT, 4G RAT, and/or 5G RAT, among other examples. By way of example, the Rx/Tx UEs may be in V2X communication with one another via a 4G RAT and a 5G RAT, where the 4G RAT is used for one set of message types (e.g., including basic safety application messages), and the 5G RAT is used for another set of message types (e.g., including advanced UC application messages).

As shown by reference number 610a, in some aspects, the Rx UE may monitor a measure of reception quality, such as a measure of reception periodicity, associated with one or more first messages. In some aspects, as shown by reference number 610b, the Tx UE may monitor a measure of transmission quality (e.g., a measure of transmission periodicity). The first messages may be messages that are to be transmitted, by the Tx UE and to the Rx UE, using a first RAT. In some aspects, the Rx UE may monitor reception periodicity by determining how often the Rx UE is receiving, or is scheduled to receive, the first messages (e.g., monitoring a number of reception opportunities for a particular time period). In some aspects, the Tx UE may monitor transmission periodicity by determining how often the Tx UE is transmitting, or is scheduled to transmit, the first messages (e.g., monitoring a number of transmissions for a particular period of time). For example, periodicity may be monitored by using a timer and/or a counter to determine the number of transmissions and/or reception opportunities over a particular period of time.

As shown by reference number 615a, in some aspects, the Rx UE may determine that reception of the first messages does not satisfy a reception quality threshold. In some aspects, as shown by reference number 615b, the Tx UE may determine that transmission of the first messages does not satisfy a transmission quality threshold. For example, the first messages may be associated with a target periodicity (e.g., based at least in part on Rx/Tx UE configuration, one or more QoS rules, requirements of an application associated with the first messages, and/or the like). In some aspects, the transmission and/or reception quality thresholds may be based at least in part on the target periodicity. For example, the transmission and/or reception quality thresholds may be a periodicity threshold that matches the target periodicity or that is below the target periodicity by a particular amount (e.g., 90% of the target periodicity, 75% of the target periodicity, and/or the like).

In some aspects, the Rx/Tx UE may determine that the reception and/or transmission of the first messages does not satisfy the reception and/or transmission quality threshold (e.g., the threshold periodicity) based at least in part on a schedule indicating the reception or transmission periodicity (e.g., currently) and a target reception or transmission periodicity. In a situation where the schedule indicates that the first messages will not be received and/or transmitted with the target reception or transmission periodicity, the Rx/Tx UE may determine that the reception and/or transmission quality threshold is not met.

In some aspects, the Rx/Tx UE may determine that the reception and/or transmission of the first messages does not satisfy the reception and/or transmission quality threshold (e.g., the threshold periodicity) based at least in part on monitoring reception or transmission periodicity, as described herein. For example, in a situation where monitoring the reception or transmission periodicity indicates that the first messages will not be received and/or transmitted with the target reception or transmission periodicity, the Rx/Tx UE may determine that the reception and/or transmission quality threshold is not met.

As shown by reference number 620, in some aspects, the Rx UE may transmit, and the Tx UE may receive, a request to adjust prioritization of the first messages. The request may be based at least in part on the periodicity (e.g., based at least in part on scheduling and/or monitoring, as described herein) not satisfying the reception periodicity threshold. For example, the request may include SCI or other information that indicates, to the Tx UE, that the priority of the first messages should be adjusted (e.g., to satisfy a target periodicity).

As shown by reference number 625, in some aspects, the Tx UE may adjust a prioritization of the first messages or one or more second messages (e.g., associated with another RAT and/or another priority different from the priority of the first messages) to prioritize the transmission of the first messages over the second messages. For example, the Tx UE may adjust a QoS of the first messages (e.g., increasing the QoS) to prioritize transmission of the first messages over the second messages. As another example, the Tx UE may adjust a QoS of the second messages (e.g., decreasing the QoS) to prioritize transmission of the first messages over the second messages.

In some aspects, the Tx UE may map the first messages for transmission via a second RAT. For example, the second RAT may be associated with a higher priority, better channel conditions, and/or the like, relative to the first RAT associated with transmission of the first messages. By mapping the first messages for transmission via the second RAT, the Tx UE will transmit the first messages with a higher priority than the first messages would have had being transmitted by the first RAT. In some aspects, one or more second messages associated with the second RAT may have a lower priority (e.g., lower QoS) than the first messages, enabling both the first messages and the second messages to be transmitted via the second RAT, but the first messages having a higher priority (e.g., in the foregoing situation).

As shown by reference number 630, in some aspects, the Tx UE may transmit, and the Rx UE may receive, data indicating the adjusted prioritization. For example, in a situation where the Tx UE adjusts the priority of the first messages (or the second messages), the Tx UE may notify the Rx UE of the adjustment (e.g., to enable the Rx UE to update one or more reception opportunities, if appropriate).

In some aspects, the Tx UE may transmit, and the Rx UE may receive, data indicating a change in transmission of the one or more first messages from the first RAT to the second RAT. For example, in a situation where the Tx UE changes the mapping of the first messages from the first RAT to the second RAT, the Tx UE may notify the Rx UE of the change (e.g., to enable the Rx UE to update one or more reception opportunities, if appropriate).

As shown by reference number 635, the Rx UE may adjust one or more reception opportunities associated with the first messages and/or the second messages to prioritize reception of the first messages over the second messages. For example, in a situation where the first messages change priority (e.g., QoS), the reception opportunities associated with the first messages may be updated to reflect the change in priority. As another example, in a situation where the first messages are being transmitted via a different RAT, the Rx UE may also need to adjust reception opportunities to receive the first messages via the different RAT.

As shown by reference number 640, the Tx UE may transmit, and the Rx UE may receive, the one or more first messages. In some aspects, the first messages may be transmitted and/or received with adjusted prioritization, as described herein. In some aspects, the first messages may be transmitted and/or received with an adjusted mapping, as described herein (e.g., from a first RAT to a second RAT).

As shown by reference number 645, the Tx UE may determine, after transmitting the one or more first messages, that an adjustment condition is satisfied. For example, the Tx UE may determine that the reason for the adjustment no longer applies. For example, in a situation where the transmission quality threshold was previously not satisfied, the adjustment condition may be satisfaction of the transmission quality threshold. By way of example, the Tx UE may determine that the adjustment condition is satisfied based at least in part on transmission of the first messages meeting a transmission periodicity threshold.

In some aspects, the Rx UE (in addition to, or as an alternative to the Tx UE) may determine, after receiving the one or more first messages, that an adjustment condition is satisfied. For example, the adjustment condition may be satisfaction of the reception quality threshold. By way of example, the Rx UE may determine that adjustment condition is satisfied based at least in part on reception of the first messages meeting a transmission periodicity threshold.

As shown by reference number 650, in some aspects, the Tx UE may readjust, based at least in part on determining that the adjustment condition is satisfied, the prioritization to prioritize transmission of the one or more second messages over one or more subsequent messages associated with the first set of messages (e.g., future transmissions of messages associated with the same application, RAT, message type, and/or the like of the first messages). For example, the Tx UE may readjust the QoS of the first messages (e.g., to a prior QoS level, a default QoS level, or the like) to end prioritization of the first messages.

In some aspects, the Tx UE may remap one or more subsequent messages, associated with the one or more first messages, for transmission via the first RAT. For example, in a situation where the Tx UE changed the mapping of the first message from the first RAT to the second RAT, the Tx UE may change the mapping back, such that future messages are transmitted via the first RAT.

In some aspects, the Rx UE may transmit, to the Tx UE, data indicating that the Tx UE should readjust the prioritization of the subsequent messages and/or remap the subsequent messages.

While the example 600 does not indicate a particular channel (e.g., data channel, physical channel, and/or the like), the first messages and/or second messages may be associated with the same channel or different channels. For example, the first messages may be sidelink control channel messages, while the second messages may be sidelink data channel messages. In some aspects, messages that may be prioritized may include various reference signals and channel data, such as reference signals, synchronization signals, control channel information, broadcast channel information, feedback channel information, data channel information, and/or the like. In some aspects, new transmissions may be prioritized differently from retransmissions.

In some aspects, certain messages may be assigned a highest priority to enable transmission and/or reception with the highest priority. For example, channels and/or signals used for maintenance of the physical layer connection, such as reference signals, synchronization signals, broadcast channel, and/or the like, may be assigned a highest QoS. In this situation, the methods described herein may be used to prioritize transmission of the messages associated with maintenance of the physical layer connection.

In some aspects, more than one type of message may not satisfy the reception and/or transmission quality threshold. In this situation, the Tx/Rx UE may determine which message(s) to prioritize based at least in part on one or more RAT characteristics of the RATs used to transmit the messages. For example, the Tx/Rx UE may determine to prioritize messages based at least in part on a radio identifier, such that a higher identifier (e.g., later evolution) may be prioritized over a lower identifier (e.g., message for transmission via 5G may be prioritized over messages for transmission via 4G). As another example, the Tx/Rx UE may determine to prioritize messages based at least in part on transmission gap between messages. For example, the message with a longer gap since a prior transmission of related messages (e.g., for the same application, on the same RAT, and/or the like) may be prioritized over a message with a shorter gap. Other RAT characteristics or combinations of characteristics may also be used to determine which messages, associated with which RATs, should be prioritized when multiple messages are not meeting transmission and/or reception quality thresholds.

As indicated above, FIG. 6 is provided as an example. Other examples may differ from what is described with respect to FIG. 6.

Figure 7:
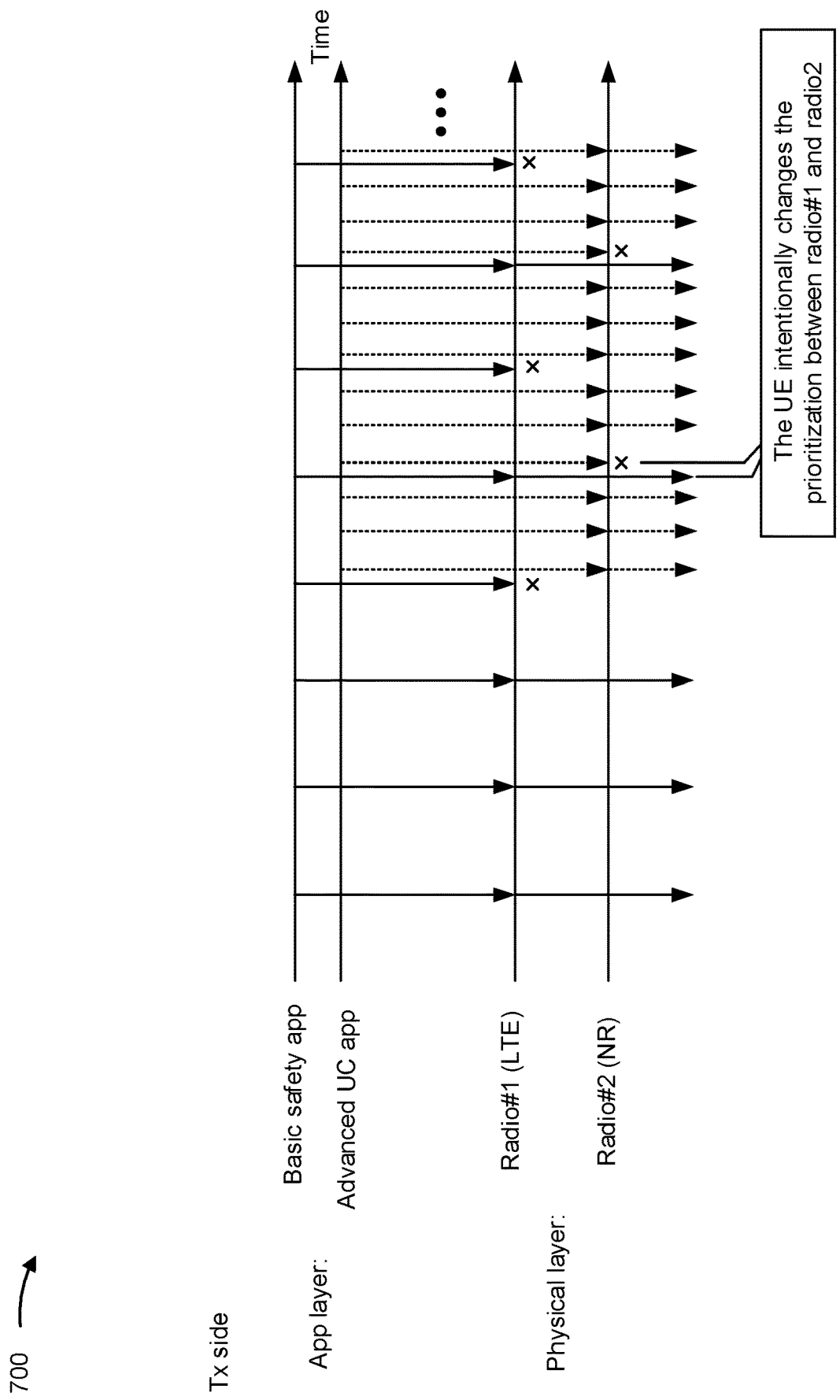
FIG. 7 is a diagram illustrating an example associated with adjusting message priority to change transmission periodicity, in accordance with the present disclosure.

FIG. 7 is a diagram illustrating an example 700 associated with adjusting message priority to change transmission periodicity, in accordance with the present disclosure. As shown in FIG. 7, a Tx UE may be using time-division multiplexing to transmit messages for a first application (e.g., a basic safety application) and a second application (e.g., an advanced UC application) via different RATs.

As shown in the example 700, the priority (e.g., QoS) associated with the advanced UC application and second radio (e.g., the NR radio) may cause basic safety application messages (represented by vertical lines and arrows as they are handled by the application and physical layers) to be de-prioritized when advanced UC application messages are being transmitted, which may lead to dropped transmissions (each indicated by X). After the first basic safety application message is dropped, the Tx UE may adjust the priority of the basic safety application messages and/or the advanced UC application messages (and/or their corresponding radios) to cause at least some of the basic safety application messages to be transmitted. As seen in the example 700, the Tx UE can switch prioritization back and forth, such that transmission of one type of message does not starve transmission of another type of message.

As indicated above, FIG. 7 is provided as an example. Other examples may differ from what is described with respect to FIG. 7.

Figure 8:
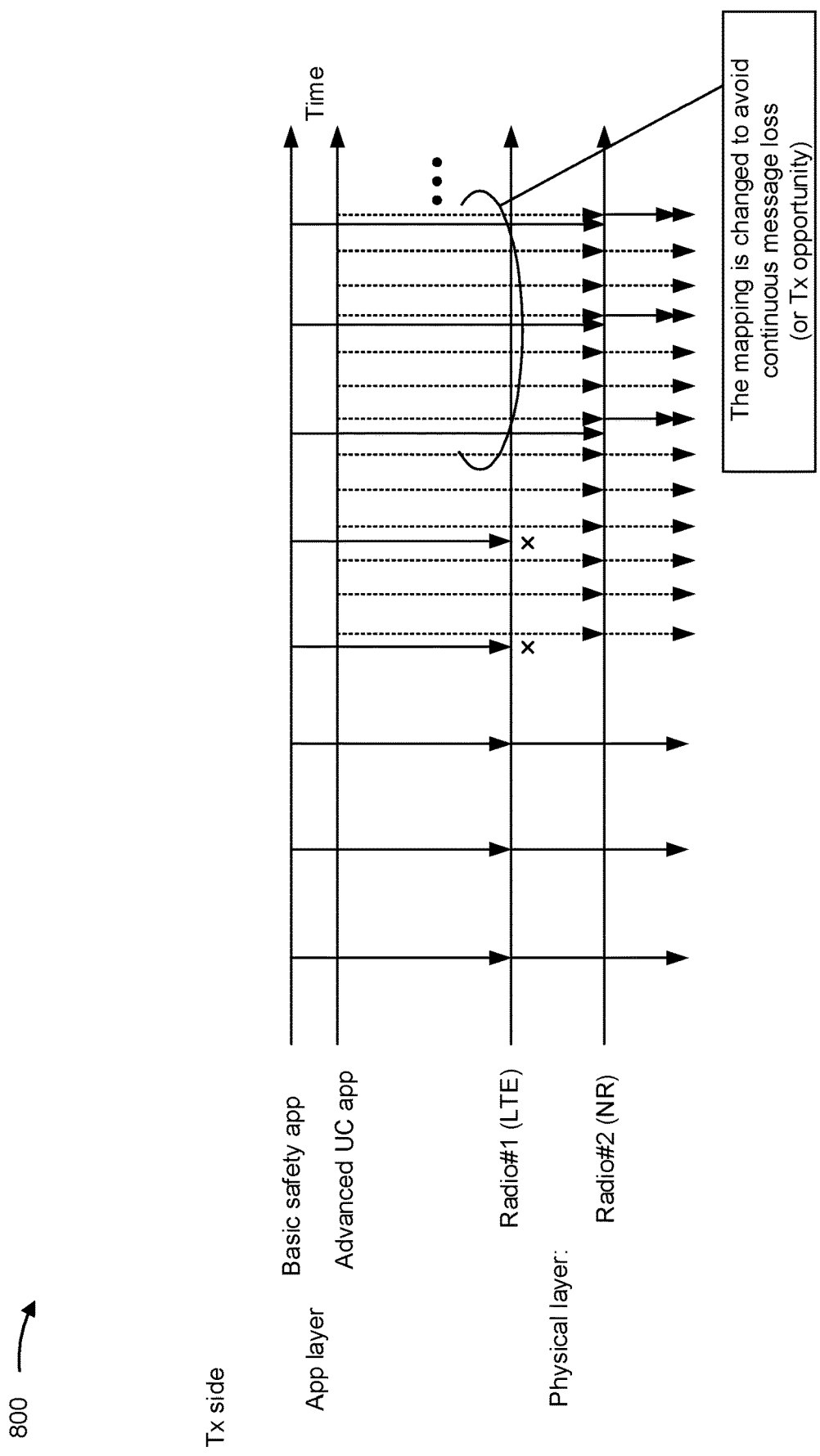
FIG. 8 is a diagram illustrating an example associated with adjusting message priority to change transmission periodicity, in accordance with the present disclosure.

FIG. 8 is a diagram illustrating an example 800 associated with adjusting message priority to change transmission periodicity, in accordance with the present disclosure. As shown in FIG. 8, a Tx UE may be using time-division multiplexing to transmit messages for a first application (e.g., a basic safety application) and a second application (e.g., an advanced UC application) via different RATs.

As shown in the example 800, the Tx UE may be transmitting basic safety application messages (represented by solid vertical lines and arrows) using LTE and advanced UC application messages (represented by dotted vertical lines and arrows) using NR. In a situation where higher priority advanced UC application messages cause a transmission quality issue with the basic safety application messages (e.g., dropped messages indicated by X), the Tx UE switching the mapping of basic safety application messages to transmit the basic safety application messages via NR instead of LTE. The basic safety application messages may be remapped periodically, e.g., to ensure a transmission quality threshold is satisfied for both the basic safety application message and the advanced UC application messages.

As indicated above, FIG. 8 is provided as an example. Other examples may differ from what is described with respect to FIG. 8.

Figure 9:
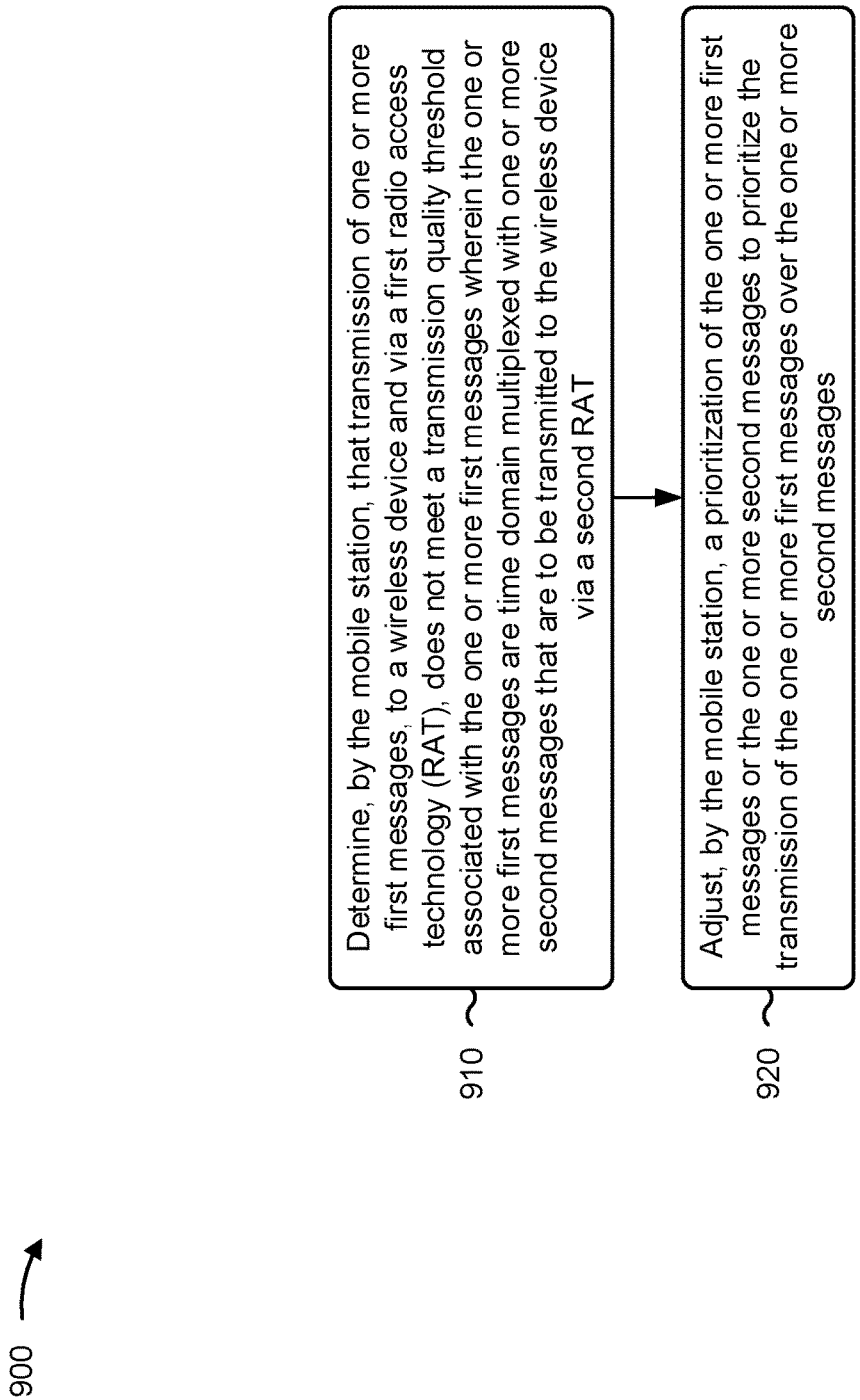
FIGS. 9-11 are diagrams illustrating example processes associated with prioritizing communications for multiple RATs, in accordance with the present disclosure.

FIG. 9 is a diagram illustrating an example process 900 performed, for example, by a mobile station, in accordance with the present disclosure. Example process 900 is an example where the mobile station (e.g., UE 120) performs operations associated with prioritizing communications for multiple radio access technologies. In some aspects, a base station (e.g., base station 110) may perform example process 900.

As shown in FIG. 9, in some aspects, process 900 may include determining that transmission of one or more first messages, to a wireless device and via a first RAT, does not meet a transmission quality threshold associated with the one or more first messages, wherein the one or more first messages are time domain multiplexed with one or more second messages that are to be transmitted to the wireless device via a second RAT (block 910). For example, the mobile station (e.g., using communication manager 140 and/or determination component 1208, depicted in FIG. 12) may determine that transmission of one or more first messages, to a wireless device and via a first RAT, does not meet a transmission quality threshold associated with the one or more first messages, wherein the one or more first messages are time domain multiplexed with one or more second messages that are to be transmitted to the wireless device via a second RAT, as described above. In some aspects, the one or more first messages are time domain multiplexed with one or more second messages that are to be transmitted to the wireless device via a second RAT.

As further shown in FIG. 9, in some aspects, process 900 may include adjusting a prioritization of the one or more first messages or the one or more second messages to prioritize the transmission of the one or more first messages over the one or more second messages (block 920). For example, the mobile station (e.g., using communication manager 140 and/or prioritization component 1210, depicted in FIG. 12) may adjust a prioritization of the one or more first messages or the one or more second messages to prioritize the transmission of the one or more first messages over the one or more second messages, as described above.

Process 900 may include additional aspects, such as any single aspect or any combination of aspects described below and/or in connection with one or more other processes described elsewhere herein.

In a first aspect, determining that the transmission of the one or more first messages does not meet the transmission quality threshold comprises determining, based at least in part on a schedule indicating transmission periodicity and a target transmission periodicity, that the transmission of the one or more first messages does not meet the transmission quality threshold.

In a second aspect, alone or in combination with the first aspect, the transmission quality threshold comprises a transmission periodicity threshold.

In a third aspect, alone or in combination with one or more of the first and second aspects, process 900 includes monitoring, by the mobile station, a measure of periodicity associated with the one or more first messages, and wherein determining that the transmission of the one or more first messages does not meet the transmission quality threshold comprises determining that the measure of periodicity does not satisfy the transmission periodicity threshold.

In a fourth aspect, alone or in combination with one or more of the first through third aspects, the transmission quality threshold is based at least in part on a QoS rule associated with the one or more first messages.

In a fifth aspect, alone or in combination with one or more of the first through fourth aspects, process 900 includes transmitting, by the mobile station and to the wireless device, data indicating the adjusted prioritization.

In a sixth aspect, alone or in combination with one or more of the first through fifth aspects, process 900 includes determining, by the mobile station and after adjusting the prioritization, that an adjustment condition is satisfied, and readjusting, by the mobile station and based at least in part on determining that the adjustment condition is satisfied, the prioritization to prioritize transmission of the one or more second messages over one or more subsequent messages associated with the one or more first messages.

In a seventh aspect, alone or in combination with one or more of the first through sixth aspects, process 900 includes determining, by the mobile station, to prioritize the transmission of the one or more first messages over the one or more second messages based at least in part on one or more RAT characteristics of at least one of the first RAT or the second RAT.

In an eighth aspect, alone or in combination with one or more of the first through seventh aspects, the one or more RAT characteristics comprise one or more of a radio identifier, or a transmission gap.

In a ninth aspect, alone or in combination with one or more of the first through eighth aspects, adjusting the prioritization comprises adjusting a first QoS associated with the one or more first messages, or adjusting a second QoS associated with the one or more second messages.

In a tenth aspect, alone or in combination with one or more of the first through ninth aspects, the wireless device comprises another mobile station, the one or more first messages are associated with a first sidelink communications channel, and the one or more second messages are associated with a second sidelink communications channel.

In an eleventh aspect, alone or in combination with one or more of the first through tenth aspects, the first RAT comprises a long-term evolution (LTE) RAT, and the second RAT comprises a fifth generation (5G) RAT.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
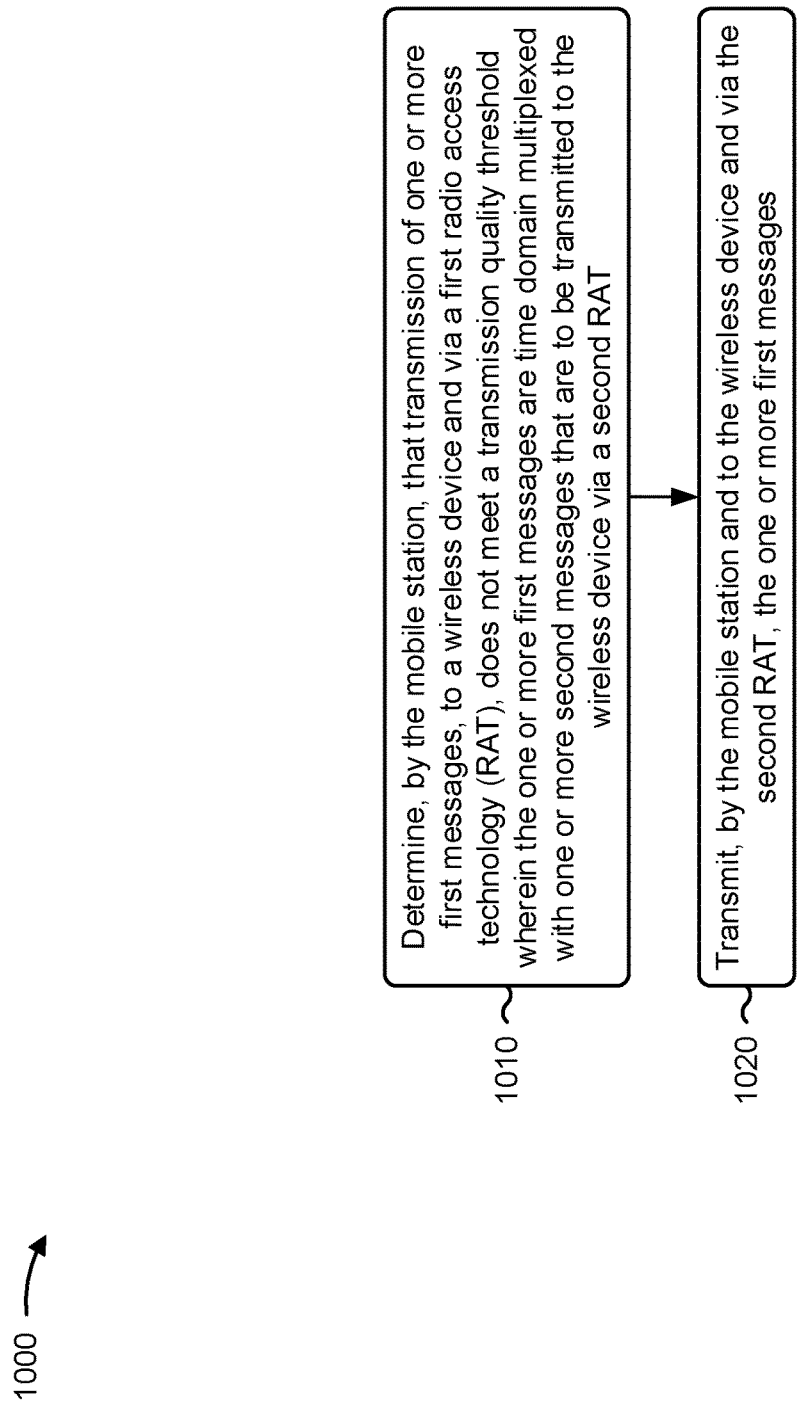

FIG. 10 is a diagram illustrating an example process 1000 performed, for example, by a mobile station, in accordance with the present disclosure. Example process 1000 is an example where the mobile station (e.g., UE 120) performs operations associated with prioritizing communications for multiple radio access technologies. In some aspects, a base station (e.g., base station 110) may perform example process 1000.

As shown in FIG. 10, in some aspects, process 1000 may include determining that transmission of one or more first messages, to a wireless device and via a first RAT, does not meet a transmission quality threshold, wherein the one or more first messages are time domain multiplexed with one or more second messages that are to be transmitted to the wireless device via a second RAT (block 1010). For example, the mobile station (e.g., using communication manager 140 and/or determination component 1208 or 1308, depicted in FIGS. 12 and 13) may determine that transmission of one or more first messages, to a wireless device and via a first RAT, does not meet a transmission quality threshold, wherein the one or more first messages are time domain multiplexed with one or more second messages that are to be transmitted to the wireless device via a second RAT, as described above. In some aspects, the one or more first messages are time domain multiplexed with one or more second messages that are to be transmitted to the wireless device via a second RAT.

As further shown in FIG. 10, in some aspects, process 1000 may include transmitting, to the wireless device and via the second RAT, the one or more first messages (block 1020). For example, the mobile station (e.g., using communication manager 140 and/or transmission component 1204, depicted in FIG. 12) may transmit, to the wireless device and via the second RAT, the one or more first messages, as described above.

Process 1000 may include additional aspects, such as any single aspect or any combination of aspects described below and/or in connection with one or more other processes described elsewhere herein.

In a first aspect, the transmission quality threshold comprises a transmission periodicity threshold.

In a second aspect, alone or in combination with the first aspect, process 1000 includes monitoring, by the mobile station, a measure of periodicity associated with the one or more first messages, and wherein determining that the transmission of the one or more first messages does not meet the transmission quality threshold comprises determining that the measure of periodicity does not satisfy the transmission periodicity threshold.

In a third aspect, alone or in combination with one or more of the first and second aspects, the transmission quality threshold is based at least in part on a QoS rule associated with the one or more first messages.

In a fourth aspect, alone or in combination with one or more of the first through third aspects, process 1000 includes transmitting, by the mobile station and to the wireless device, data indicating a change in transmission of the one or more first messages from the first RAT to the second RAT.

In a fifth aspect, alone or in combination with one or more of the first through fourth aspects, process 1000 includes determining, by the mobile station and after transmitting the one or more first messages, that an adjustment condition is satisfied, and mapping, by the mobile station and based at least in part on determining that the adjustment condition is satisfied, one or more subsequent messages, associated with the one or more first messages, for transmission via the first RAT.

In a sixth aspect, alone or in combination with one or more of the first through fifth aspects, process 1000 includes mapping, by the mobile station, the one or more first messages for transmission via the second RAT based at least in part on one or more RAT characteristics of at least one of the first RAT or the second RAT.

In a seventh aspect, alone or in combination with one or more of the first through sixth aspects, the one or more RAT characteristics comprise one or more of a radio identifier, or a transmission gap.

In an eighth aspect, alone or in combination with one or more of the first through seventh aspects, the wireless device comprises another mobile station, the one or more first messages are associated with a first sidelink communications channel, and the one or more second messages are associated with a second sidelink communications channel.

In a ninth aspect, alone or in combination with one or more of the first through eighth aspects, the first RAT comprises a long-term evolution (LTE) RAT, and the second RAT comprises a fifth generation (5G) RAT.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
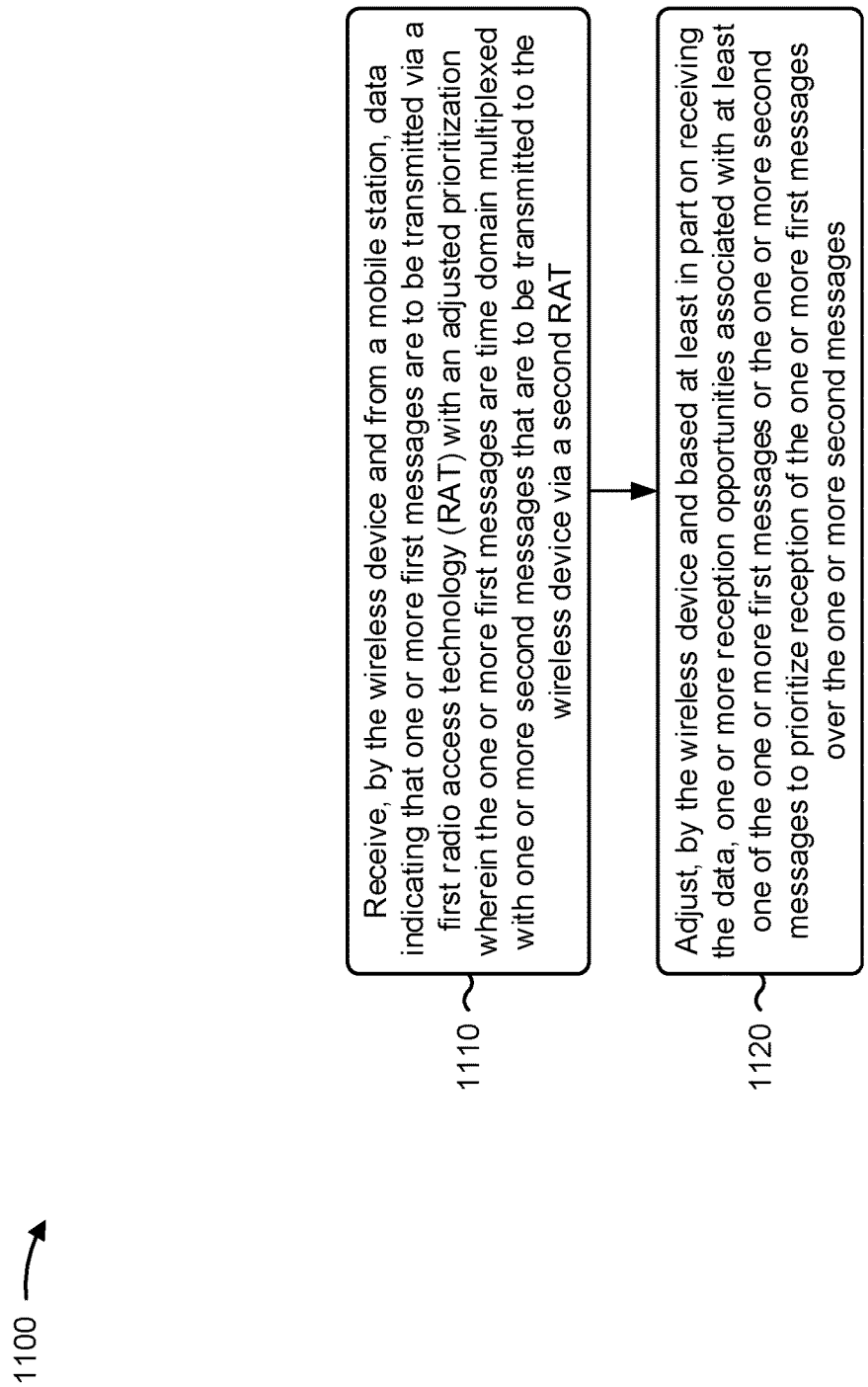

FIG. 11 is a diagram illustrating an example process 1100 performed, for example, by a wireless device, in accordance with the present disclosure. Example process 1100 is an example where the wireless device (e.g., base station 110 or UE 120) performs operations associated with prioritizing communications for multiple radio access technologies.

As shown in FIG. 11, in some aspects, process 1100 may include receiving, from a mobile station, data indicating that one or more first messages are to be transmitted via a first RAT with an adjusted prioritization, wherein the one or more first messages are time domain multiplexed with one or more second messages that are to be transmitted to the wireless device via a second RAT (block 1110). For example, the wireless device (e.g., using communication manager 140 or 150 and/or reception component 1202 or 1302, depicted in FIGS. 12 and 13) may receive, from a mobile station, data indicating that one or more first messages are to be transmitted via a first RAT with an adjusted prioritization, wherein the one or more first messages are time domain multiplexed with one or more second messages that are to be transmitted to the wireless device via a second RAT, as described above. In some aspects, the one or more first messages are time domain multiplexed with one or more second messages that are to be transmitted to the wireless device via a second RAT.

As further shown in FIG. 11, in some aspects, process 1100 may include adjusting, based at least in part on receiving the data, one or more reception opportunities associated with at least one of the one or more first messages or the one or more second messages to prioritize reception of the one or more first messages over the one or more second messages (block 1120). For example, the wireless device (e.g., using communication manager 140 or 150 and/or prioritization component 1210 or 1310, depicted in FIGS. 12 and 13) may adjust, based at least in part on receiving the data, one or more reception opportunities associated with at least one of the one or more first messages or the one or more second messages to prioritize reception of the one or more first messages over the one or more second messages, as described above.

Process 1100 may include additional aspects, such as any single aspect or any combination of aspects described below and/or in connection with one or more other processes described elsewhere herein.

In a first aspect, process 1100 includes monitoring, by the wireless device, a measure of periodicity associated with the one or more first messages, and transmitting, by the wireless device and to the mobile station, a request to adjust prioritization of the one or more first messages based at least in part on the measure of periodicity not satisfying a reception periodicity threshold.

In a second aspect, alone or in combination with the first aspect, the reception periodicity threshold is based at least in part on a QoS rule associated with the one or more first messages.

In a third aspect, alone or in combination with one or more of the first and second aspects, process 1100 includes determining, by the wireless device and after adjusting the prioritization, that an adjustment condition is satisfied, and transmitting, by the wireless device and to the mobile station, a request to readjust prioritization of subsequent messages, associated with the one or more first messages, based at least in part on the adjustment condition being satisfied.

In a fourth aspect, alone or in combination with one or more of the first through third aspects, adjusting the one or more reception opportunities comprises adjusting a first QoS associated with the one or more first messages, or adjusting a second QoS associated with the one or more second messages.

In a fifth aspect, alone or in combination with one or more of the first through fourth aspects, the wireless device comprises another mobile station, the one or more first messages are associated with a first sidelink communications channel, and the one or more second messages are associated with a second sidelink communications channel.

In a sixth aspect, alone or in combination with one or more of the first through fifth aspects, the first RAT comprises a long-term evolution (LTE) RAT, and the second RAT comprises a fifth generation (5G) RAT.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
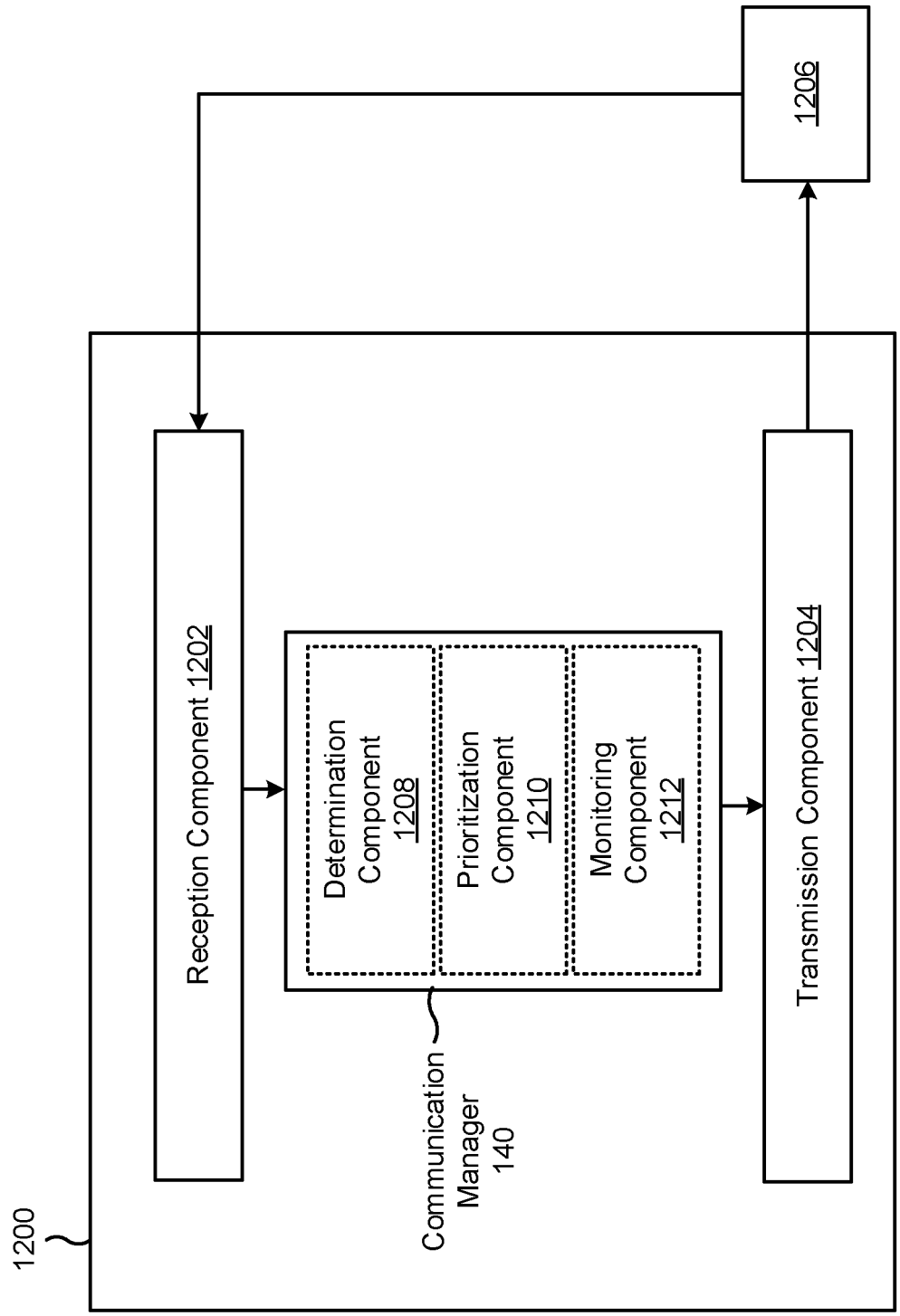
FIGS. 12 and 13 are diagrams of example apparatuses for wireless communication, in accordance with the present disclosure.

FIG. 12 is a diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include one or more of a determination component 1208, a prioritization component 1210, or a monitoring component 1212, among other examples.

In some aspects, the apparatus 1200 may be configured to perform one or more operations described herein in connection with FIGS. 3-8. Additionally, or alternatively, the apparatus 1200 may be configured to perform one or more processes described herein, such as process 900 of FIG. 9, process 1000 of FIG. 10, process 1100 of FIG. 11, or a combination thereof. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The determination component 1208 may determine that transmission of one or more first messages, to a wireless device and via a first RAT, does not meet a transmission quality threshold associated with the one or more first messages wherein the one or more first messages are time domain multiplexed with one or more second messages that are to be transmitted to the wireless device via a second RAT. The prioritization component 1210 may adjust a prioritization of the one or more first messages or the one or more second messages to prioritize the transmission of the one or more first messages over the one or more second messages.

The monitoring component 1212 may monitor a measure of periodicity associated with the one or more first messages.

The transmission component 1204 may transmit, to the wireless device, data indicating the adjusted prioritization.

The determination component 1208 may determine, after adjusting the prioritization, that an adjustment condition is satisfied.

The prioritization component 1210 may readjust, based at least in part on determining that the adjustment condition is satisfied, the prioritization to prioritize transmission of the one or more second messages over one or more subsequent messages associated with the one or more first messages.

The determination component 1208 may determine to prioritize the transmission of the one or more first messages over the one or more second messages based at least in part on one or more RAT characteristics of at least one of the first RAT or the second RAT.

The transmission component 1204 may transmit, to the wireless device, data indicating a change in transmission of the one or more first messages from the first RAT to the second RAT.

The prioritization component 1210 may map, based at least in part on determining that the adjustment condition is satisfied, one or more subsequent messages, associated with the one or more first messages, for transmission via the first RAT.

The prioritization component 1210 may map the one or more first messages for transmission via the second RAT based at least in part on one or more RAT characteristics of at least one of the first RAT or the second RAT.

The reception component 1202 may receive, from a mobile station, data indicating that one or more first messages are to be transmitted via a first RAT with an adjusted prioritization wherein the one or more first messages are time domain multiplexed with one or more second messages that are to be transmitted to the wireless device via a second RAT. The prioritization component 1210 may adjust, based at least in part on receiving the data, one or more reception opportunities associated with at least one of the one or more first messages or the one or more second messages to prioritize reception of the one or more first messages over the one or more second messages.

The transmission component 1204 may transmit, to the mobile station, a request to adjust prioritization of the one or more first messages based at least in part on the measure of periodicity not satisfying a reception periodicity threshold.

The transmission component 1204 may transmit, to the mobile station, a request to readjust prioritization of subsequent messages, associated with the one or more first messages, based at least in part on the adjustment condition being satisfied.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
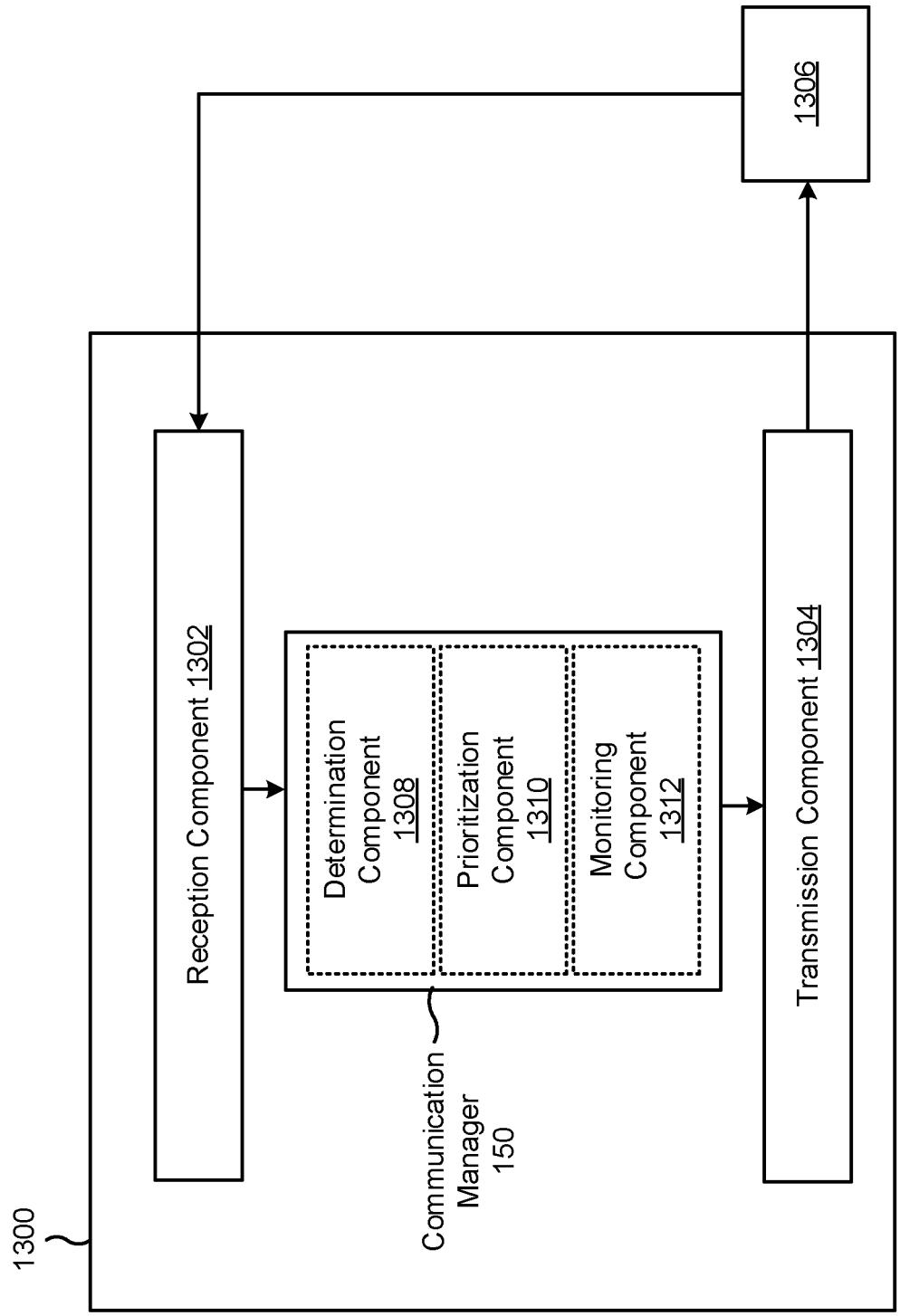

FIG. 13 is a diagram of an example apparatus 1300 for wireless communication. The apparatus 1300 may be a base station, or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 150. The communication manager 150 may include one or more of a determination component 1308, a prioritization component 1310, or a monitoring component 1312, among other examples.

In some aspects, the apparatus 1300 may be configured to perform one or more operations described herein in connection with FIGS. 3-8. Additionally, or alternatively, the apparatus 1300 may be configured to perform one or more processes described herein, such as process 900 of FIG. 9, process 1000 of FIG. 10, process 1100 of FIG. 11, or a combination thereof. In some aspects, the apparatus 1300 and/or one or more components shown in FIG. 13 may include one or more components of the base station described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the base station described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the base station described in connection with FIG. 2. In some aspects, the transmission component 1304 may be co-located with the reception component 1302 in a transceiver.

The determination component 1308 may determine that transmission of one or more first messages, to a wireless device and via a first RAT, does not meet a transmission quality threshold associated with the one or more first messages wherein the one or more first messages are time domain multiplexed with one or more second messages that are to be transmitted to the wireless device via a second RAT. The prioritization component 1310 may adjust a prioritization of the one or more first messages or the one or more second messages to prioritize the transmission of the one or more first messages over the one or more second messages.

The monitoring component 1312 may monitor a measure of periodicity associated with the one or more first messages.

The transmission component 1304 may transmit, to the wireless device, data indicating the adjusted prioritization.

The determination component 1308 may determine, after adjusting the prioritization, that an adjustment condition is satisfied.

The prioritization component 1310 may readjust, based at least in part on determining that the adjustment condition is satisfied, the prioritization to prioritize transmission of the one or more second messages over one or more subsequent messages associated with the one or more first messages.

The determination component 1308 may determine to prioritize the transmission of the one or more first messages over the one or more second messages based at least in part on one or more RAT characteristics of at least one of the first RAT or the second RAT.

The determination component 1308 may determine that transmission of one or more first messages, to a wireless device and via a first RAT, does not meet a transmission quality threshold wherein the one or more first messages are time domain multiplexed with one or more second messages that are to be transmitted to the wireless device via a second RAT. The transmission component 1304 may transmit, to the wireless device and via the second RAT, the one or more first messages.

The monitoring component 1312 may monitor a measure of periodicity associated with the one or more first messages.

The transmission component 1304 may transmit, to the wireless device, data indicating a change in transmission of the one or more first messages from the first RAT to the second RAT.

The prioritization component 1310 may map, based at least in part on determining that the adjustment condition is satisfied, one or more subsequent messages, associated with the one or more first messages, for transmission via the first RAT.

The prioritization component 1310 may map the one or more first messages for transmission via the second RAT based at least in part on one or more RAT characteristics of at least one of the first RAT or the second RAT.

The reception component 1302 may receive, from a mobile station, data indicating that one or more first messages are to be transmitted via a first RAT with an adjusted prioritization wherein the one or more first messages are time domain multiplexed with one or more second messages that are to be transmitted to the wireless device via a second RAT. The prioritization component 1310 may adjust, based at least in part on receiving the data, one or more reception opportunities associated with at least one of the one or more first messages or the one or more second messages to prioritize reception of the one or more first messages over the one or more second messages.

The transmission component 1304 may transmit, to the mobile station, a request to adjust prioritization of the one or more first messages based at least in part on the measure of periodicity not satisfying a reception periodicity threshold.

The transmission component 1304 may transmit, to the mobile station, a request to readjust prioritization of subsequent messages, associated with the one or more first messages, based at least in part on the adjustment condition being satisfied.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a mobile station, comprising: determining, by the mobile station, that transmission of one or more first messages, to a wireless device and via a first RAT, does not meet a transmission quality threshold associated with the one or more first messages, wherein the one or more first messages are time domain multiplexed with one or more second messages that are to be transmitted to the wireless device via a second RAT; and adjusting, by the mobile station, a prioritization of the one or more first messages or the one or more second messages to prioritize the transmission of the one or more first messages over the one or more second messages.

Aspect 2: The method of Aspect 1, wherein determining that the transmission of the one or more first messages does not meet the transmission quality threshold comprises: determining, by the mobile station and based at least in part on a schedule indicating transmission periodicity and a target transmission periodicity, that the transmission of the one or more first messages does not meet the transmission quality threshold.

Aspect 3: The method of any of Aspects 1-2, wherein the transmission quality threshold comprises a transmission periodicity threshold.

Aspect 4: The method of Aspect 3, further comprising: monitoring, by the mobile station, a measure of periodicity associated with the one or more first messages; and wherein determining that the transmission of the one or more first messages does not meet the transmission quality threshold comprises: determining that the measure of periodicity does not satisfy the transmission periodicity threshold. wherein determining that the transmission of the one or more first messages does not meet the transmission quality threshold comprises: determining that the measure of periodicity does not satisfy the transmission periodicity threshold.

Aspect 5: The method of any of Aspects 1-4, wherein the transmission quality threshold is based at least in part on a QoS rule associated with the one or more first messages.

Aspect 6: The method of any of Aspects 1-5, further comprising: transmitting, by the mobile station and to the wireless device, data indicating the adjusted prioritization.

Aspect 7: The method of any of Aspects 1-6, further comprising: determining, by the mobile station and after adjusting the prioritization, that an adjustment condition is satisfied; and readjusting, by the mobile station and based at least in part on determining that the adjustment condition is satisfied, the prioritization to prioritize transmission of the one or more second messages over one or more subsequent messages associated with the one or more first messages.

Aspect 8: The method of any of Aspects 1-7, further comprising: determining, by the mobile station, to prioritize the transmission of the one or more first messages over the one or more second messages based at least in part on one or more RAT characteristics of at least one of the first RAT or the second RAT.

Aspect 9: The method of Aspect 8, wherein the one or more RAT characteristics comprise one or more of: a radio identifier, or a transmission gap.

Aspect 10: The method of any of Aspects 1-9, wherein adjusting the prioritization comprises: adjusting a first QoS associated with the one or more first messages, or adjusting a second QoS associated with the one or more second messages.

Aspect 11: The method of any of Aspects 1-10, wherein the wireless device comprises another mobile station, the one or more first messages are associated with a first sidelink communications channel, and the one or more second messages are associated with a second sidelink communications channel Aspect 12: The method of any of Aspects 1-11, wherein the first RAT comprises a long-term evolution (LTE) RAT, and the second RAT comprises a fifth generation (5G) RAT.

Aspect 13: A method of wireless communication performed by a mobile station, comprising: determining, by the mobile station, that transmission of one or more first messages, to a wireless device and via a first RAT, does not meet a transmission quality threshold, wherein the one or more first messages are time domain multiplexed with one or more second messages that are to be transmitted to the wireless device via a second RAT; and transmitting, by the mobile station and to the wireless device and via the second RAT, the one or more first messages.

Aspect 14: The method of Aspect 13, wherein the transmission quality threshold comprises a transmission periodicity threshold.

Aspect 15: The method of Aspect 14, further comprising: monitoring, by the mobile station, a measure of periodicity associated with the one or more first messages; and wherein determining that the transmission of the one or more first messages does not meet the transmission quality threshold comprises: determining that the measure of periodicity does not satisfy the transmission periodicity threshold. wherein determining that the transmission of the one or more first messages does not meet the transmission quality threshold comprises: determining that the measure of periodicity does not satisfy the transmission periodicity threshold.

Aspect 16: The method of any of Aspects 14-15, wherein the transmission quality threshold is based at least in part on a QoS rule associated with the one or more first messages.

Aspect 17: The method of any of Aspects 14-16, further comprising: transmitting, by the mobile station and to the wireless device, data indicating a change in transmission of the one or more first messages from the first RAT to the second RAT.

Aspect 18: The method of any of Aspects 14-17, further comprising: determining, by the mobile station and after transmitting the one or more first messages, that an adjustment condition is satisfied; and mapping, by the mobile station and based at least in part on determining that the adjustment condition is satisfied, one or more subsequent messages, associated with the one or more first messages, for transmission via the first RAT.

Aspect 19: The method of any of Aspects 14-18, further comprising: mapping, by the mobile station, the one or more first messages for transmission via the second RAT based at least in part on one or more RAT characteristics of at least one of the first RAT or the second RAT.

Aspect 20: The method of Aspect 19, wherein the one or more RAT characteristics comprise one or more of: a radio identifier, or a transmission gap.

Aspect 21: The method of any of Aspects 14-20, wherein the wireless device comprises another mobile station, the one or more first messages are associated with a first sidelink communications channel, and the one or more second messages are associated with a second sidelink communications channel Aspect 22: The method of any of Aspects 14-21, wherein the first RAT comprises a long-term evolution (LTE) RAT, and the second RAT comprises a fifth generation (5G) RAT.

Aspect 23: A method of wireless communication performed by a wireless device, comprising: receiving, by the wireless device and from a mobile station, data indicating that one or more first messages are to be transmitted via a first RAT with an adjusted prioritization, wherein the one or more first messages are time domain multiplexed with one or more second messages that are to be transmitted to the wireless device via a second RAT; and adjusting, by the wireless device and based at least in part on receiving the data, one or more reception opportunities associated with at least one of the one or more first messages or the one or more second messages to prioritize reception of the one or more first messages over the one or more second messages.

Aspect 24: The method of Aspect 23, further comprising: monitoring, by the wireless device, a measure of periodicity associated with the one or more first messages; and transmitting, by the wireless device and to the mobile station, a request to adjust prioritization of the one or more first messages based at least in part on the measure of periodicity not satisfying a reception periodicity threshold.

Aspect 25: The method of Aspect 24, wherein the reception periodicity threshold is based at least in part on a QoS rule associated with the one or more first messages.

Aspect 26: The method of any of Aspects 23-25, further comprising: determining, by the wireless device and after adjusting the prioritization, that an adjustment condition is satisfied; and transmitting, by the wireless device and to the mobile station, a request to readjust prioritization of subsequent messages, associated with the one or more first messages, based at least in part on the adjustment condition being satisfied.

Aspect 27: The method of any of Aspects 23-26, wherein adjusting the one or more reception opportunities comprises: adjusting a first QoS associated with the one or more first messages, or adjusting a second QoS associated with the one or more second messages.

Aspect 28: The method of any of Aspects 23-27, wherein the wireless device comprises another mobile station, the one or more first messages are associated with a first sidelink communications channel, and the one or more second messages are associated with a second sidelink communications channel Aspect 29: The method of any of Aspects 23-28, wherein the first RAT comprises a long-term evolution (LTE) RAT, and the second RAT comprises a fifth generation (5G) RAT.

Aspect 30: An apparatus for wireless communication at a device, comprising a processor; memory coupled with the processor; and instructions stored in the memory and executable by the processor to cause the apparatus to perform the method of one or more of Aspects 1-12.

Aspect 31: An apparatus for wireless communication at a device, comprising a processor; memory coupled with the processor; and instructions stored in the memory and executable by the processor to cause the apparatus to perform the method of one or more of Aspects 13-22.

Aspect 32: An apparatus for wireless communication at a device, comprising a processor; memory coupled with the processor; and instructions stored in the memory and executable by the processor to cause the apparatus to perform the method of one or more of Aspects 23-29.

Aspect 33: A device for wireless communication, comprising a memory and one or more processors coupled to the memory, the one or more processors configured to perform the method of one or more of Aspects 1-12.

Aspect 34: A device for wireless communication, comprising a memory and one or more processors coupled to the memory, the one or more processors configured to perform the method of one or more of Aspects 13-22.

Aspect 35: A device for wireless communication, comprising a memory and one or more processors coupled to the memory, the one or more processors configured to perform the method of one or more of Aspects 23-29.

Aspect 36: An apparatus for wireless communication, comprising at least one means for performing the method of one or more of Aspects 1-12.

Aspect 37: An apparatus for wireless communication, comprising at least one means for performing the method of one or more of Aspects 13-22.

Aspect 38: An apparatus for wireless communication, comprising at least one means for performing the method of one or more of Aspects 23-29.

Aspect 39: A non-transitory computer-readable medium storing code for wireless communication, the code comprising instructions executable by a processor to perform the method of one or more of Aspects 1-12.

Aspect 40: A non-transitory computer-readable medium storing code for wireless communication, the code comprising instructions executable by a processor to perform the method of one or more of Aspects 13-22.

Aspect 41: A non-transitory computer-readable medium storing code for wireless communication, the code comprising instructions executable by a processor to perform the method of one or more of Aspects 23-29.

Aspect 42: A non-transitory computer-readable medium storing a set of instructions for wireless communication, the set of instructions comprising one or more instructions that, when executed by one or more processors of a device, cause the device to perform the method of one or more of Aspects 1-12.

Aspect 43: A non-transitory computer-readable medium storing a set of instructions for wireless communication, the set of instructions comprising one or more instructions that, when executed by one or more processors of a device, cause the device to perform the method of one or more of Aspects 13-22.

Aspect 44: A non-transitory computer-readable medium storing a set of instructions for wireless communication, the set of instructions comprising one or more instructions that, when executed by one or more processors of a device, cause the device to perform the method of one or more of Aspects 23-29.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a mobile station, comprising:
   one or more memories; and
   one or more processors configured to, based at least in part on information stored in the one or more memories:
      identify one or more first messages, for transmission to a wireless device via a first radio access technology (RAT), that do not meet a transmission quality threshold associated with the one or more first messages,
         wherein the one or more first messages are time domain multiplexed with one or more second messages that are to be transmitted to the wireless device via a second RAT; and
      adjust, using one or more RAT characteristics of at least one of the first RAT or the second RAT, a prioritization of the one or more first messages or the one or more second messages to prioritize the transmission of the one or more first messages over the one or more second messages,
         wherein the one or more RAT characteristics comprise one or more of:
            a radio identifier, or
            a transmission gap.

2. The apparatus of claim 1, wherein the transmission quality threshold comprises a transmission periodicity threshold.

3. The apparatus of claim 2, wherein the one or more processors are further configured to:
   monitor a measure of periodicity associated with the one or more first messages; and
   wherein the one or more processors, to determine that the transmission of the one or more first messages does not meet the transmission quality threshold, are configured to:
      determine that the measure of periodicity does not satisfy the transmission periodicity threshold.

4. The apparatus of claim 1, wherein the transmission quality threshold is based at least in part on a quality of service (QoS) rule associated with the one or more first messages.

5. The apparatus of claim 1, wherein the one or more processors are further configured to:
   transmit, to the wireless device, data indicating the adjusted prioritization.

6. The apparatus of claim 1, wherein the one or more processors are further configured to:
   determine, after adjusting the prioritization, that an adjustment condition is satisfied; and
   readjust, based at least in part on determining that the adjustment condition is satisfied, the prioritization to prioritize transmission of the one or more second messages over one or more subsequent messages associated with the one or more first messages.

7. The apparatus of claim 1, wherein the one or more processors, to adjust the prioritization, are configured to:
   adjust a first quality of service (QoS) associated with the one or more first messages, or adjust a second QoS associated with the one or more second messages.

8. The apparatus of claim 1, wherein the wireless device comprises another mobile station,
   the one or more first messages are associated with a first sidelink communications channel, and
   the one or more second messages are associated with a second sidelink communications channel.

9. The apparatus of claim 1, wherein the first RAT comprises a long-term evolution (LTE) RAT, and the second RAT comprises a fifth generation (5G) RAT.

10. The apparatus of claim 1, wherein the one or more processors are further configured to:
   determine to prioritize the transmission of the one or more first messages over the one or more second messages based at least in part on one or more RAT characteristics of at least one of the first RAT or the second RAT.

11. The apparatus of claim 10, wherein the one or more RAT characteristics comprise one or more of:
   a radio identifier, or
   a transmission gap.

12. An apparatus for wireless communication at a mobile station, comprising:
   one or more memories; and
   one or more processors configured to, based at least in part on information stored in the one or more memories:
      identify one or more first messages, for transmission to a wireless device and via a first radio access technology (RAT), that do not meet a transmission quality threshold, wherein the one or more first messages are time domain multiplexed with one or more second messages that are to be transmitted to the wireless device via a second RAT;

map, using one or more RAT characteristics of at least one of the first RAT or the second RAT, the one or more first messages for transmission via the second RAT, wherein the one or more RAT characteristics comprise one or more of:
a radio identifier, or
a transmission gap; and transmit, to the wireless device and via the second RAT, the one or more first messages.

13. The apparatus of claim 12, wherein the transmission quality threshold comprises a transmission periodicity threshold.

14. The apparatus of claim 13, wherein the one or more processors are further configured to:
monitor a measure of periodicity associated with the one or more first messages; and
wherein the one or more processors, to determine that the transmission of the one or more first messages does not meet the transmission quality threshold, are configured to:
determine that the measure of periodicity does not satisfy the transmission periodicity threshold.

15. The apparatus of claim 12, wherein the transmission quality threshold is based at least in part on a quality of service (QoS) rule associated with the one or more first messages.

16. The apparatus of claim 12, wherein the one or more processors are further configured to:
transmit, to the wireless device, data indicating a change in transmission of the one or more first messages from the first RAT to the second RAT.

17. The apparatus of claim 12, wherein the one or more processors are further configured to:
determine, after transmitting the one or more first messages, that an adjustment condition is satisfied; and
map, based at least in part on determining that the adjustment condition is satisfied, one or more subsequent messages, associated with the one or more first messages, for transmission via the first RAT.

18. The apparatus of claim 12, wherein the wireless device comprises another mobile station,
the one or more first messages are associated with a first sidelink communications channel, and
the one or more second messages are associated with a second sidelink communications channel.

19. The apparatus of claim 12, wherein the first RAT comprises a long-term evolution (LTE) RAT, and the second RAT comprises a fifth generation (5G) RAT.

20. An apparatus for wireless communication at a wireless device, comprising:
one or more memories; and
one or more processors configured to, based at least in part on information stored in the one or more memories:
receive, from a mobile station, data indicating that one or more first messages are to be transmitted via a first radio access technology (RAT) with an adjusted prioritization,
wherein the one or more first messages are time domain multiplexed with one or more second messages that are to be transmitted to the wireless device via a second RAT; and adjust, based at least in part on receiving the data, one or more reception opportunities associated with at least one of the one or more first messages or the one or more second messages to prioritize reception of the one or more first messages over the one or more second messages.

21. The apparatus of claim 20, wherein the one or more processors are further configured to:
monitor a measure of periodicity associated with the one or more first messages; and
transmit, to the mobile station, a request to adjust prioritization of the one or more first messages based at least in part on the measure of periodicity not satisfying a reception periodicity threshold.

22. The apparatus of claim 21, wherein the reception periodicity threshold is based at least in part on a quality of service (QoS) rule associated with the one or more first messages.

23. The apparatus of claim 20, wherein the one or more processors are further configured to:
determine, after adjusting the prioritization, that an adjustment condition is satisfied; and
transmit, to the mobile station, a request to readjust prioritization of subsequent messages, associated with the one or more first messages, based at least in part on the adjustment condition being satisfied.

24. The apparatus of claim 20, wherein the one or more processors, to adjust the one or more reception opportunities, are configured to:
adjust a first quality of service (QoS) associated with the one or more first messages, or adjust a second QoS associated with the one or more second messages.

25. The apparatus of claim 20, wherein the wireless device comprises another mobile station,
the one or more first messages are associated with a first sidelink communications channel, and
the one or more second messages are associated with a second sidelink communications channel.

26. The apparatus of claim 20, wherein the first RAT comprises a long-term evolution (LTE) RAT, and the second RAT comprises a fifth generation (5G) RAT.

27. A method of wireless communication performed by a mobile station, comprising:
identifying, by the mobile station, one or more first messages, for transmission to a wireless device via a first radio access technology (RAT), that do not meet a transmission quality threshold associated with the one or more first messages,
wherein the one or more first messages are time domain multiplexed with one or more second messages that are to be transmitted to the wireless device via a second RAT; and
adjusting, by the mobile station and using one or more RAT characteristics of at least one of the first RAT or the second RAT, a prioritization of the one or more first messages or the one or more second messages to prioritize the transmission of the one or more first messages over the one or more second messages.

28. The method of claim 27, wherein the transmission quality threshold comprises a transmission periodicity threshold.

29. The method of claim 28, further comprising:
monitoring a measure of periodicity associated with the one or more first messages; and
wherein identifying the one or more first messages that do not meet the transmission quality threshold comprises:

determining that the measure of periodicity does not satisfy the transmission periodicity threshold.

30. The method of claim 27, wherein the transmission quality threshold is based at least in part on a quality of service (QoS) rule associated with the one or more first messages.

* * * * *